(12) United States Patent  (10) Patent No.: US 8,112,385 B2
Azizi et al.  (45) Date of Patent: Feb. 7, 2012

(54) READY TO RENDER BUSINESS INTELLIGENCE RESULT SETS

(75) Inventors: Soufiane Azizi, Ottawa (CA); David Cushing, Osgoode (CA)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/473,916

(22) Filed: Jun. 23, 2006

(65) Prior Publication Data

US 2007/0061292 A1   Mar. 15, 2007

(30) Foreign Application Priority Data

Sep. 13, 2005   (CA) .................................... 2518881

(51) Int. Cl.
    *G06F 7/00* (2006.01)
    *G06F 17/00* (2006.01)
(52) U.S. Cl. ......... 707/603; 707/713; 707/758; 715/762
(58) Field of Classification Search .............. 707/3, 102, 707/603, 999.003, 999.102, 713, 758; 715/762
    See application file for complete search history.

(56) References Cited

U.S. PATENT DOCUMENTS

| | | | | |
|---|---|---|---|---|
| 5,864,871 | A * | 1/1999 | Kitain et al. ............ | 707/999.009 |
| 6,609,123 | B1 * | 8/2003 | Cazemier et al. .................. | 707/4 |
| 6,768,986 | B2 * | 7/2004 | Cras et al. .......................... | 707/2 |
| 6,826,557 | B1 * | 11/2004 | Carter et al. ....................... | 707/2 |
| 7,051,038 | B1 * | 5/2006 | Yeh et al. ....................... | 707/102 |
| 7,181,450 | B2 * | 2/2007 | Malloy et al. ..................... | 707/4 |
| 7,359,898 | B1 * | 4/2008 | Acton et al. ....................... | 707/5 |
| 7,373,351 | B2 * | 5/2008 | Wu et al. ......................... | 707/711 |
| 7,454,412 | B2 * | 11/2008 | Diewald et al. ......... | 707/999.003 |
| 7,516,121 | B2 * | 4/2009 | Liu et al. ................ | 707/999.002 |
| 2002/0091681 | A1 * | 7/2002 | Cras et al. .......................... | 707/3 |
| 2003/0172082 | A1 * | 9/2003 | Benoit et al. ................... | 707/101 |
| 2005/0010565 | A1 * | 1/2005 | Cushing et al. ................... | 707/3 |
| 2005/0010566 | A1 * | 1/2005 | Cushing et al. ................... | 707/3 |
| 2005/0038767 | A1 * | 2/2005 | Verschell et al. ................. | 707/1 |
| 2005/0050011 | A1 * | 3/2005 | Van Der Linden et al. ....... | 707/3 |
| 2005/0262087 | A1 * | 11/2005 | Wu et al. ........................... | 707/9 |
| 2005/0289125 | A1 * | 12/2005 | Liu et al. ........................... | 707/3 |
| 2006/0004816 | A1 * | 1/2006 | Diewald et al. ............... | 707/101 |

OTHER PUBLICATIONS

Alan Simpson at el, Mastering Access 97 for Windows 95/NT, 1997, Fouth Edition, pp. 187-204, 267-270, 447-472, 477-520 and 1045.*

* cited by examiner

*Primary Examiner* — Phong Nguyen
(74) *Attorney, Agent, or Firm* — Samuel K. Simpson; Patent Ingenuity, P.C.

(57) ABSTRACT

A query that is based on a predefined format of an arbitrary query language is received. A data analyzing component performs the query to obtain a query result. The query result and a report layout specification are provided from the data analyzing component to a data processing component, the data processing component being on a computer. The data processing component associates the query result with at least one element of the report layout specification to generate an association. The query result is provided from the data processing component through an interface based on the report layout specification without reliance on the type of the arbitrary query language to a rendering component. The report layout specification is provided from the data analyzing component to the rendering component to render the query result in a report according to the association without reliance on the type of the arbitrary query language.

8 Claims, 7 Drawing Sheets

| Year | Product line | Revenue |
|---|---|---|
| 2004 | Camping Equipment | $20,471,328.88 |
| | Golf Equipment | $5,597,980.86 |
| | Mountaineering Equipment | $0.00 |
| | Outdoor Protection | $1,536,456.24 |
| | Personal Accessories | $7,144,797.52 |
| 2005 | Camping Equipment | $31,373,606.46 |
| | Golf Equipment | $9,598,268.88 |
| | Mountaineering Equipment | $9,642,674.54 |
| | Outdoor Protection | $988,230.64 |
| | Personal Accessories | $10,955,708.04 |
| 2006 | Camping Equipment | $37,869,055.58 |
| | Golf Equipment | $10,709,215.84 |
| | Mountaineering Equipment | $11,248,676.06 |
| | Outdoor Protection | $646,428.04 |
| | Personal Accessories | $13,793,960.30 |

Figure 3

| Year | Product line | Revenue |
|---|---|---|
| 2004 | Camping Equipment | $20,471,328.88 |
| | Golf Equipment | $5,597,980.86 |
| | Mountaineering Equipment | $0.00 |
| | Outdoor Protection | $1,536,456.24 |
| | Personal Accessories | $7,144,797.52 |
| 2004 | | $34,750,563.50 |
| 2005 | Camping Equipment | $31,373,606.46 |
| | Golf Equipment | $9,598,268.88 |
| | Mountaineering Equipment | $9,642,674.54 |
| | Outdoor Protection | $988,230.64 |
| | Personal Accessories | $10,955,708.04 |
| 2005 | | $62,558,488.56 |
| 2006 | Camping Equipment | $37,869,055.58 |
| | Golf Equipment | $10,709,215.84 |
| | Mountaineering Equipment | $11,248,676.06 |
| | Outdoor Protection | $646,428.04 |
| | Personal Accessories | $13,793,960.30 |
| 2006 | | $74,267,335.82 |
| Summary | | $171,576,387.88 |

Figure 4

| Revenue | Camping Equipment | Golf Equipment | Mountaineering Equipment | Outdoor Protection | Personal Accessories |
|---|---|---|---|---|---|
| 2004 2004 Q1 | $3,984,224.50 | $975,181.00 | $0.00 | $321,983.90 | $1,314,078.74 |
| 2004 Q2 | $5,075,177.96 | $1,871,413.20 | $0.00 | $611,615.92 | $1,678,313.76 |
| 2004 Q3 | $4,645,255.82 | $1,169,527.46 | $0.00 | $477,277.94 | $1,704,449.46 |
| 2004 Q4 | $6,766,670.60 | $1,581,859.20 | $0.00 | $125,578.48 | $2,447,955.56 |
| 2005 2005 Q1 | $5,638,050.96 | $1,553,249.68 | $1,469,736.86 | $212,782.46 | $1,731,011.08 |
| 2005 Q2 | $8,479,008.16 | $3,763,377.96 | $3,149,221.48 | $343,938.86 | $2,976,215.82 |
| 2005 Q3 | $7,760,772.76 | $1,485,202.42 | $2,181,671.86 | $316,900.86 | $2,750,767.14 |
| 2005 Q4 | $9,495,774.58 | $2,796,438.82 | $2,842,044.34 | $114,608.46 | $3,497,714.00 |
| 2006 2006 Q1 | $8,162,650.72 | $1,796,219.58 | $1,848,903.76 | $121,930.90 | $2,278,711.36 |
| 2006 Q2 | $9,449,464.76 | $3,559,611.16 | $3,438,010.72 | $232,016.54 | $3,612,369.56 |
| 2006 Q3 | $7,370,377.14 | $2,152,470.24 | $2,392,993.94 | $192,489.80 | $3,073,856.14 |
| 2006 Q4 | $12,886,562.96 | $3,200,914.86 | $3,568,767.64 | $99,990.80 | $4,829,023.24 |

| Revenue | Camping Equipment | Golf Equipment | Mountaineering Equipment | Outdoor Protection | Personal Accessories |
|---|---|---|---|---|---|
| 2004 Q1 | $3,984,224.50 | $975,181.00 | $0.00 | $321,983.90 | $1,314,078.74 |
| 2004 Q2 | $5,075,177.96 | $1,871,413.20 | $0.00 | $611,615.92 | $1,678,313.76 |
| 2004 Q3 | $4,645,255.82 | $1,169,527.46 | $0.00 | $477,277.94 | $1,704,449.46 |
| 2004 Q4 | $6,766,670.60 | $1,581,859.20 | $0.00 | $125,578.48 | $2,447,955.56 |

2005

| Revenue | Camping Equipment | Golf Equipment | Mountaineering Equipment | Outdoor Protection | Personal Accessories |
|---|---|---|---|---|---|
| 2005 Q1 | $5,638,050.96 | $1,553,249.68 | $1,469,736.86 | $212,782.46 | $1,731,011.08 |
| 2005 Q2 | $8,479,008.16 | $3,763,377.96 | $3,149,221.48 | $343,938.86 | $2,976,215.82 |
| 2005 Q3 | $7,760,772.76 | $1,485,202.42 | $2,181,671.86 | $316,900.86 | $2,750,767.14 |
| 2005 Q4 | $9,495,774.58 | $2,796,438.82 | $2,842,044.34 | $114,608.46 | $3,497,714.00 |

2006

| Revenue | Camping Equipment | Golf Equipment | Mountaineering Equipment | Outdoor Protection | Personal Accessories |
|---|---|---|---|---|---|
| 2006 Q1 | $8,162,650.72 | $1,796,219.58 | $1,848,903.76 | $121,930.90 | $2,278,711.36 |
| 2006 Q2 | $9,449,464.76 | $3,559,611.16 | $3,438,010.72 | $232,016.54 | $3,612,369.56 |
| 2006 Q3 | $7,370,377.14 | $2,152,470.24 | $2,392,993.94 | $192,489.80 | $3,073,856.14 |
| 2006 Q4 | $12,886,562.96 | $3,200,914.86 | $3,568,767.64 | $99,990.80 | $4,829,023.24 |

Figure 6

READY TO RENDER BUSINESS INTELLIGENCE RESULT SETS

FIELD OF THE INVENTION

The present invention relates to data access middleware and in particular to a system and method of producing business intelligence data sets that can be rendered easily within user interface application systems.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. Those data analyzing applications typically have query engines that access the data stores to obtain desired data. The accessed data stores can be either relational or multidimensional stores, which are based on fundamentally different data storage technologies and hence produce fundamentally different result set structures.

Some data analyzing applications have Online Analytical Processing (OLAP) query engines to allow users to analyze multidimensional views of data This type of OLAP is sometimes called Multidimensional OLAP (MOLAP). A MOLAP engine summarizes business data into multidimensional views in advance, and places the summarized data in a cube structure. When a user request is received, the MOLAP engine accesses the summarized data, and thus the MOLAP engine can provide a response to the query very fast. The user can rotate the cube structured data to see a desired view of the data using the MOLAP engine.

There also exist Relational OLAP (ROLAP) query engines that extract data from traditional relational databases. ROLAP engines are able to create multidimensional views on the fly. In order to extract data, those ROLAP engines typically use complex Structured Query Language (SQL) statements against relational tables in the relational databases. ROLAP engines tend to be used on data that has a large number of attributes, where the data cannot be easily placed into a cube structure. ROLAP engines support multidimensional queries issued against relational databases. Some ROLAP engines translate OLAP queries into SQL queries, and other ROLAP query engines implement the access to relational databases using internal communication between components responsible for OLAP and relational operations.

SUMMARY OF THE INVENTION

For a BI application that is required to render various types of reports (lists, grouped lists, cross tabs, charts, maps, repeaters, and a combination of these), having to deal with raw data means an exponential increase in its complexity. Presenting such an application with a system that turns raw data into highly formatted data gives the BI application the ability to render all types of reports in a simple and consistent manner. The system provides an abstraction and a data model that is independent of the raw underlying data In one aspect of the disclosure, a method is provided. The method receives a query that is based on a predefined format of an arbitrary query language. Further, the method performs, with a data analyzing component, the query to obtain a query result. In addition, the method provides the query result and a report layout specification from the data analyzing component to a data processing component, the data processing component being on a computer. The method also associates, with the data processing component, the query result with at least one element of the report layout specification to generate an association. Further, the method provides the query result from the data processing component through an interface based on the report layout specification without reliance on the type of the arbitrary query language to a rendering component. In addition, the method provides the report layout specification from the data analyzing component to the rendering component to render the query result in a report according to the association without reliance on the type of the arbitrary query language. A report specified in the report layout specification is one of a chart, a detailed list report type that is tabular with each row including a detailed fact value that corresponds to a combination of non-fact columns in each row, a grouped summary report type that is tabular with at least one grouping column and at least one fact column, a grouped detail list report type that includes detail and summary fact values, a cross tab report that includes a set of members along a row and column axis, and a master detail report that associates rows within a report with other reports including parallel detail information.

In another aspect of the disclosure, a computer readable memory has computer executable instructions stored therein. The computer executable instructions when executed on a computer cause the computer to receive a query that is based on a predefined format of an arbitrary query language. Further, the computer executable instructions when executed on the computer cause the computer to perform, with a data analyzing component, the query to obtain a query result. In addition, the computer executable instructions when executed on the computer cause the computer to provide the query result and a report layout specification from the data analyzing component to a data processing component. The data processing component is on the computer. The computer executable instructions when executed on the computer cause the computer to associate, with the data processing component, the query result with at least one element of the report layout specification to generate an association. Further, the computer executable instructions when executed on the computer cause the computer to provide the query result from the data processing component through an interface based on the report layout specification without reliance on the type of the arbitrary query language to a rendering component. In addition, the computer executable instructions when executed on the computer cause the computer to provide the report layout specification from the data analyzing component to the rendering component to render the query result in a report according to the association without reliance on the type of the arbitrary query language. A report specified in the report layout specification is one of a chart, a detailed list report type that is tabular with each row including a detailed fact value that corresponds to a combination of non-fact columns in each row, a grouped summary report type that is tabular with at least one grouping column and at least one fact column, a grouped detail list report type that includes detail and summary fact values, a cross tab report that includes a set of members along a row and column axis, and a master detail report that associates rows within a report with other reports including parallel detail information.

In yet another aspect of the disclosure, a method receives a query that is based on a predefined format of an arbitrary query language. The method performs the query to obtain a query result. Further, the method provides the query result and a report layout specification to a computer. In addition, the method associates, with the computer, the query result with at least one element of the report layout specification to generate an association. The method also provides the query result through an interface based on the report layout specification without reliance on the type of the arbitrary query language. Further, the method renders the query result in a report according to the association without reliance on the type of the arbitrary query language. A report specified in the report layout specification is one of a chart, a detailed list report type that is tabular with each row including a detailed fact value that corresponds to a combination of non-fact columns in each row, a grouped summary report type that is tabular with at least one grouping column and at least one fact column, a grouped detail list report type that includes detail and summary fact values, a cross tab report that includes a set of members along a row and column axis, and a master detail report that associates rows within a report with other reports including parallel detail information.

BRIEF DESCRIPTION OF THE DRAWINGS

These and other features of the invention will become more apparent from the following description in which reference is made to the appended drawings wherein:

FIG. 3 illustrates an example of a grouped list report;

FIG. 4 illustrates an example of a grouped list report with footer values;

FIG. 5 illustrates an example of a cross tab report;

FIG. 6 illustrates an example of a master/detail report;

DETAILED DESCRIPTION OF THE INVENTION

The present invention accepts both a query and business intelligence original report layout specification and returns the results of the query via a programming interface that presents the data relative to the original report layout specification. In this manner, a rendering component 16 is able to render the results of the data by relating the original report layout specification elements with the objects returned by the programming interface. A query can be posed in an arbitrary query language as long as the results of the query are associated with elements in the original report layout specification. As such, the programming interface is independent of both the query language, such as SQL or MDX, and the underlying data source technology and as a result, a rendering component 106 can be built that is independent of these concerns as well. The relationship between a data analyzing system 102, a data processing system 104 and a rendering component 16 is illustrated in FIG. 1.

Figures 1, 2:
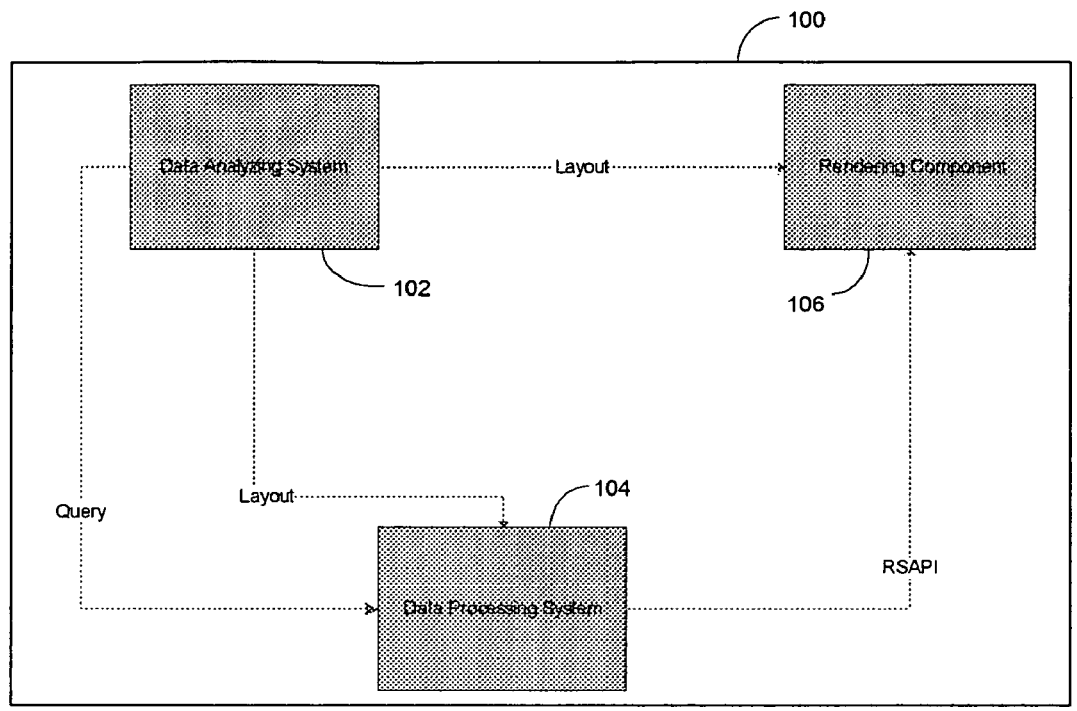
FIG. 1 shows in a block diagram an example of a business intelligence system, in accordance with an embodiment of the present invention.
FIG. 2 illustrates an example of a detail list report.

FIG. 1 shows a system 100 that has a Data Analyzing component (or sub-system) 102, a Rendering component 106, and a Data Processing component 104. The Data Analyzing component 102 provides both a query and a layout specification to the Data Processing component 104. The Data Analyzing component 102 also provides the same layout specification to the Rendering component 106. The Data Processing component 104 then provides the results of the query it received from the Data Analyzing component 102 via a programming interface that presents the data relative to the layout specification. The Rendering component 106 renders the results of the data by relating it to the layout specification that it received from the Data Analyzing system 102.

Original Report Layout Specification

An original report layout specification is capable of containing one or more report specifications where each report may be one of the following standard BI report types:

Detail List Report.
  A detailed list report is tabular report where each row contains detailed fact values that correspond to the combination of non-fact columns in each row. An example of a detail list report 110 is shown in FIG. 2.

Grouped List Report.
  A grouped summary report is a tabular report that consists of one or more grouping columns and one or more fact columns. Fact values are aggregated according to the different combinations of the grouping column values. The rows are not homogeneous, as the fact values do not necessarily represent the same level of summarization. FIGS. 3 and 4 show an example of a grouped list report 120, and an example of a grouped list report with footer values 130, respectively.

Grouped Detail List Report.
  A grouped detail report contains both detail and summary fact values. In essence, it can be thought of as a combination of the first two reports.

Cross Tab Report.
  A cross tab report consists of a collection of members along a row and columns axis; members along each edge may be from one or more dimensions and may exhibit parent/child relationships. The cells of a cross tab contain data values corresponding to the intersection of members from each axis of the report. FIG. 5 shows an example of a cross tab report 140.

Master/Detail Report.
  A master/detail report consists of a master report in which the rows or one or more rowsets within the report have zero are associated with other reports containing parallel detail information. FIG. 6 shows an example of a master/detail report 150.

Figure 7:
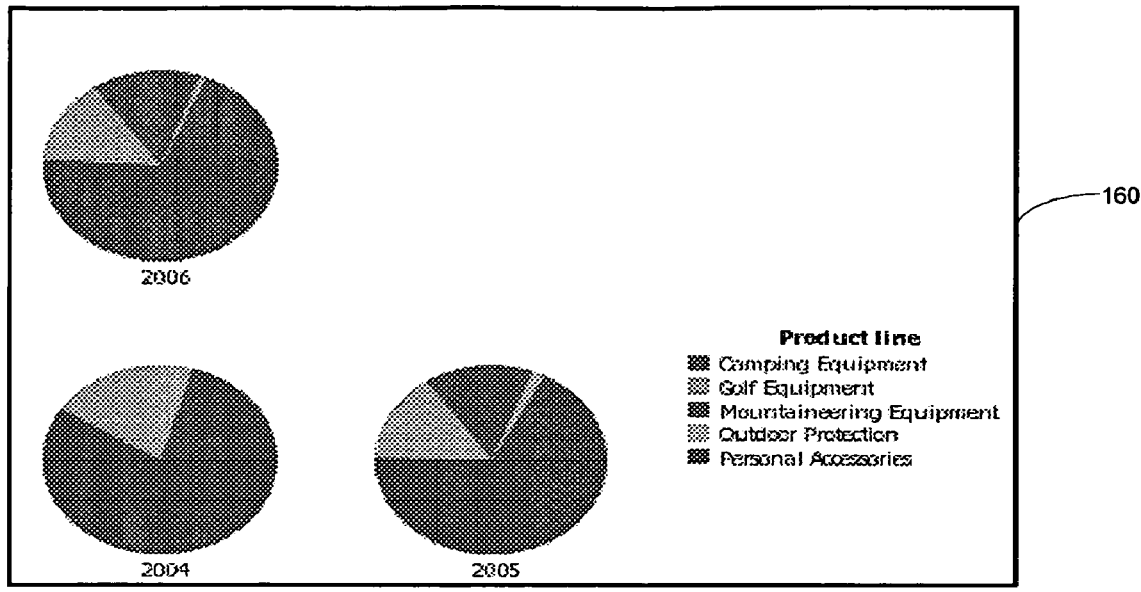
FIG. 7 illustrates an example of a chart report.

Charts.
  A chart can be thought of as a graphical representation of any one of the above report types, or a combination thereof FIG. 7 shows an example of a chart report 160.

The layout of the above BI reports can be described using the following BI layout elements:

Data Item Reference.
  A data item is a construct from a query specification that returns zero or more values from the underlying data source.
  Data item references within the QRD provide the links back to the original data query and as such, the QRD is independent of the query and the language in which the query is posed Value Set.
: A value set can define:
  : A collection of detail data item references.
  : A single key data item reference.
  : A combination of the above two constructs, in which case the detail data item references are grouped by the key data item.

Multi-Dimensional Property Reference.
: It is possible for the values of a data item reference to represent multi-dimensional members, typically as member unique names. In such cases, applications usually require the values of multi-dimensional properties of those members. Within a value set it is possible to specify which properties are required for each member returned in the result set. These properties include such things as the member caption, parent, level, etc.

Header/Footer.
: A value set may have associated with it a header or footer data item reference, or both. Either construct defines a data item whose values are associated with the entire group of values for value set.

Group.
: A group defines an arrangement/nesting of values sets and/or other groups. This flexible definition of a group allows for the specification of rather arbitrary, but meaningful, report layouts.

Edge.
: An edge is a collection of zero or more groups. A layout with a single edge is typically presented as a list report. A layout with 2 or 3 edges is typically presented as a cross tab (rows, columns, slicer). A report with more than 3 edges may be presented as a multi-page report or some sort of chart.

The Result Set Application Programming Interface (RSAPI) returns data to a client application via a collection of interface classes relative to the original report layout specification, not to the query used to obtain data from the underlying data source, allowing a rendering component to match data values returned from the RSAPI with their layout specification for rendering purposes. As a consequence, a rendering component can be implemented which is independent of the data storage technology, the query language, and the query itself.

Result Set Retrieval Object Model

Figure 8:
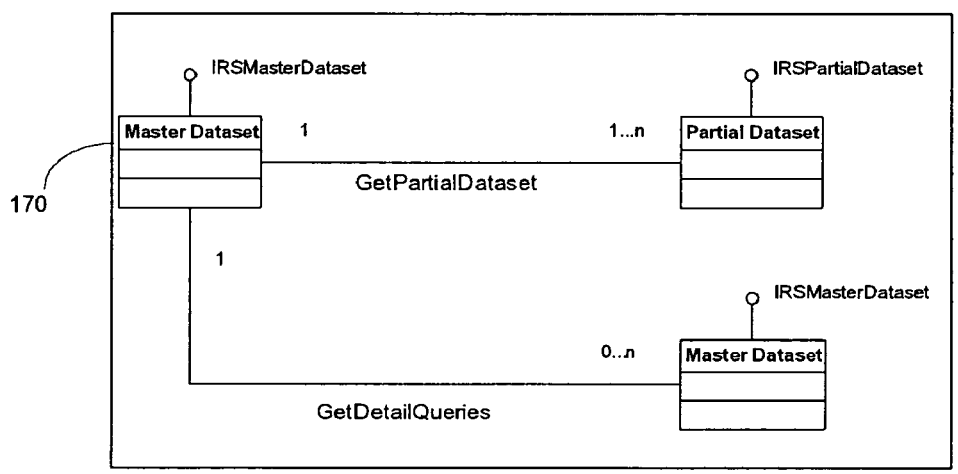
FIG. 8 shows in an object diagram an example of a master dataset and partial data set objects, in accordance with an embodiment of the present invention.

Upon execution of a query, an application using the RSAPI obtains a pointer to an IRSMasterDataset object 170, an example of which is shown in FIG. 8. A master dataset provides access to:
: A method returning metadata describing how data being returned by the RSAPI is organized and how it relates to the original report layout specification.
: A method that returns data for a specified portion of the overall result set of data
: A method that returns a vector of other master datasets that represent parallel detail reports in the case of a master detail report specification.

Figure 9:
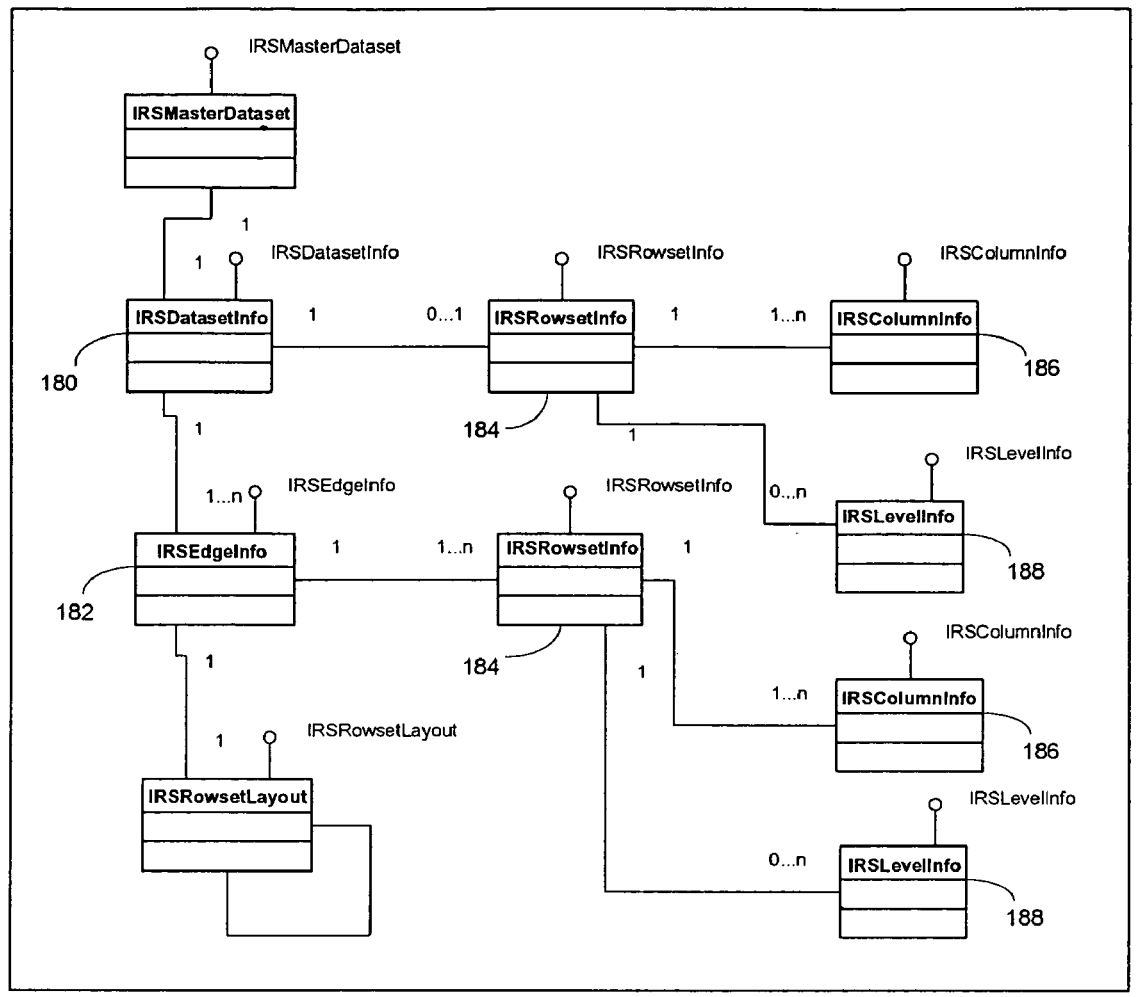
FIG. 9 shows in an object diagram an example of a master dataset object and its child objects, in accordance with an embodiment of the present invention.

A method of the master dataset object returns a pointer to an instance of the IRSDatasetInfo class 180. An IRSDatasetInfo object is the root of a collection of classes that convey all of the information required by a rendering component to render the data, including associations with the original report layout specification, an example of which is shown in FIG. 9.

An IRSDatasetInfo object 180 is the root of a result set's metadata and provides access to:
: The name of the original report layout specification upon which it is based.
: The name of the query upon which the data is based.
: The number of edges in the result set. This is the same as the number of edges in the original report layout specification.
: IRSEdgeInfo objects 182 describing each edge of the result set. The objects are ordered based on their ordinal value in the original report layout specification.
: An IRSRowsetInfo object 184 describing the cell rowset iterator, if one is present.

An IRSEdgeInfo object 182 is the root of a edge's metadata and provides access to:
: The name of the edge, if specified in the original report layout specification.
: The number of coordinates on the edge.
: The number of rowsets contained within the edge.
: IRSRowset objects 184 describing each rowset within the edge.

An IRSRowsetInfo object 184 describes a rowset and provides access to:
: The name of the value set upon from the original report layout specification upon which the rowset is based
: The ID of the rowset. Each rowset is assigned an ID that is unique within the context of the edge in which it occurs. The IRSRowset objects 184 of an edge are contained within a vector and the ID of a rowset is its index within this vector.
: The number of rows and columns in the rows et.
: The ID of the rowsets, if present in the original report layout specification, that represent the header or footer for the rowset, the parent or child rowsets of a rowset (in the case of nesting of value sets along an edge) or the rowset that follows the current rowset along the edge.
: A vector of IRSColumnInfo objects 186 describing each of the columns within the rowset.
: A vector of IRSLevelInfo objects 188 describing the levels associated with a rowset in the case that multi-dimensional members are present in the result data.
: An indication if the rowset represents a collection of measures.

An IRSColumnInfo object 186 returns information regarding the values returned for a column (data item):
: Data type, length, scale, precision and whether null values are supported.
: Name of the data item from the original report layout specification on which the column is based.
: Display label.
: Sub-type, in the case of columns with data types of MIME or URL.
: ISO Currency code, if the column values represent those of a single ISO currency.

Figure 10:
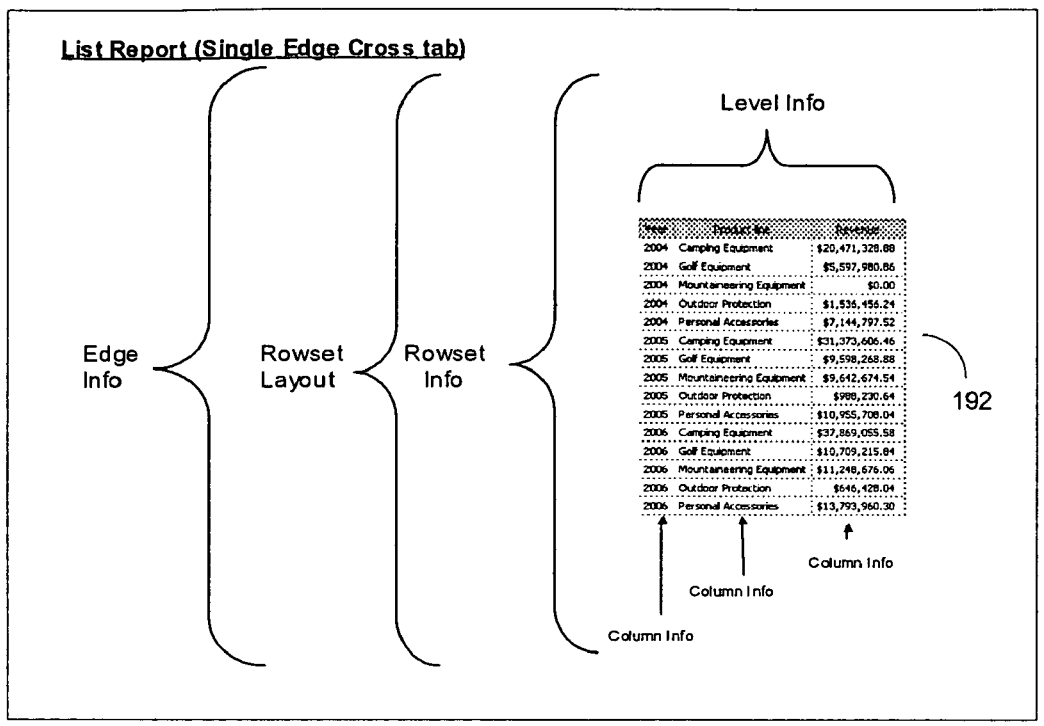
FIG. 10 shows an example of the relationship between display items in a list report and corresponding RSAPI informational objects.
Figure 11:
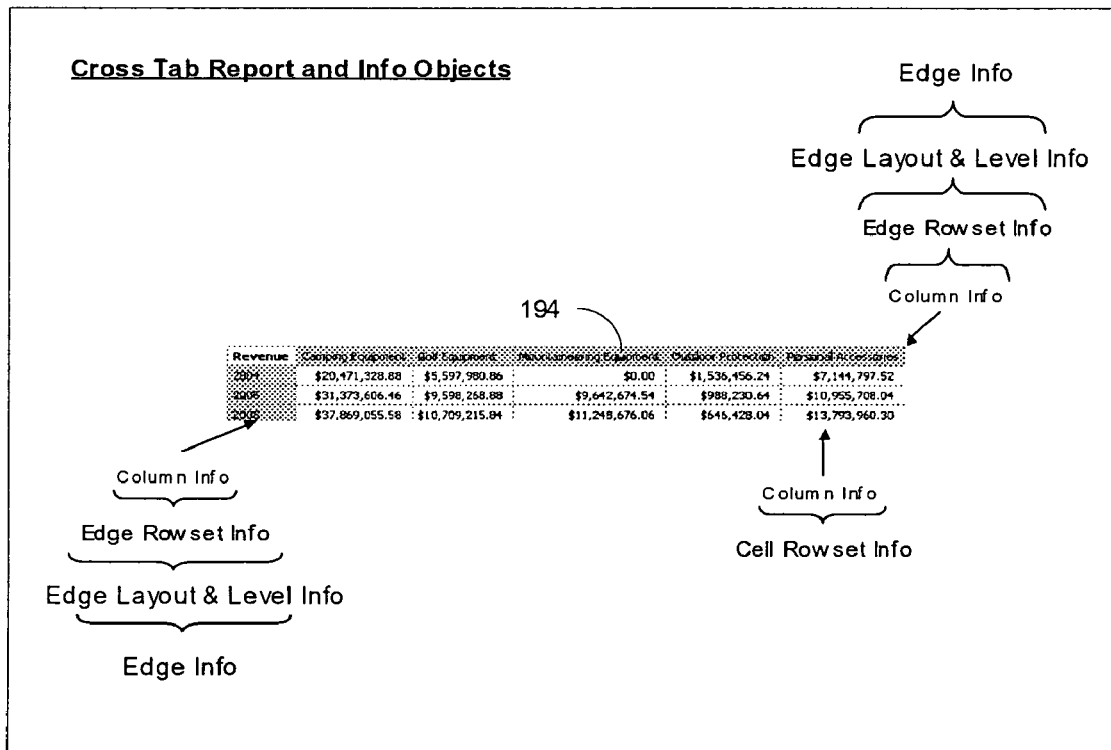
FIG. 11 shows an example of the relationship between display items in a cross tab report and corresponding RSAPI informational objects.

Each IRSRowsetInfo object 184 optionally contains a vector of IRSLevelInfo objects 188. Each IRSLevelInfo object 188 returns the label assigned to a level with the original report layout specification, if such a label was present. The levels are described in the order in which they appear in the rowset. Note that for multi-dimensional data, the level information can assist an application in producing a richer presentation of the data but that it is not essential to the rendering of the data. FIG. 10 shows an example of the relationship between display items in a list report 192 and RSAPI informational objects, in accordance with an embodiment of the present invention. FIG. 11 shows an example of the relationship between display items in a cross tab report 194 and RSAPI informational objects.

Examples of Layout Specifications and Corresponding Dataset Informational Objects The following is an example of a layout specification for a detail list report 110 as shown in FIG. 2:

```
<queryResultDefinition name="Query1.0" refQuery="Query1">
    <edges>
        <edge name="columns">
            <edgeGroups>
                <edgeGroup>
                    <valueSets>
                        <valueSet name="list">
                            <groupBody name="groupBody">
                                <dataItemRef refDataItem="Year"/>
                                <dataItemRef refDataItem="Product line"/>
                                <dataItemRef refDataItem="Revenue"/>
                            </groupBody>
                        </valueSet>
                    </valueSets>
                </edgeGroup>
            </edgeGroups>
        </edge>
    </edges>
</queryResultDefinition>
```

The following is an example of the corresponding dataset information for the detail list report 110 as shown in FIG. 2:

```
<datasetInfo  Report_name="Query1.0"  Query_name="Query1"
              Number_of_edges="1">
    <edgeInfo ordinal="0" Edge_name="columns"
Number_of_rowsets="1">
        <rowsetInfo  Rowset_name="list"    id="0"
                     headerRowsetId="-1"   footerRowsetId="-1"
                     parentRowsetId="-1"   childRowsetId="-1"
                     nextRowsetId="-1"     numColumns="3"
                     isMeasure="0">
            <columnInfo  name="Year"              label="Year"
                         isProperty="0"           type="string"
                         subType=""               nullsOk="true"
                         length="-1"              precision="0"
                         scale="0"                currencyCode=""/>
            <columnInfo  name="Product line"      label="Product line"
                         isProperty="0"           type="string"
                         subType=""               nullsOk="true"
                         length="-1"              precision="0"
                         scale="0"                currencyCode=""/>
            <columnInfo  name="Revenue"           label="Revenue"
                         isProperty="0"           type="double"
                         subType=""               nullsOk="true"
                         length="8"               precision="2"
                         scale="0"                currencyCode=""/>
        </rowsetInfo>
    </edgeInfo>
</datasetInfo>
```

The following is an example of a layout specification for a grouped list report 120 shown in FIG. 3:

```
<queryResultDefinition name="Query1.0" refQuery="Query1">
    <edges>
        <edge name="columns">
            <edgeGroups>
                <edgeGroup>
                    <valueSets>
                        <valueSet name="Year" refDataItem="Year"/>
                    </valueSets>
                    <edgeGroups>
                        <edgeGroup>
                            <valueSets>
                                <valueSet  name="Product Line"
                                           refDataItem="Product line"/>
                            </valueSets>
                            <edgeGroups>
                                <edgeGroup>
                                    <valueSets>
                                        <valueSet name="Revenue">
                                            <groupBody name="Revenue">
                                                <dataItemRef refDataItem="Revenue"/>
                                            </groupBody>
                                        </valueSet>
                                    </valueSets>
                                </edgeGroup>
                            </edgeGroups>
                        </edgeGroup>
                    </edgeGroups>
                </edgeGroup>
            </edgeGroups>
        </edge>
    </edges>
</queryResultDefinition>
```

The following is an example of the corresponding dataset information for the grouped list report 120 shown in FIG. 3:

```
<datasetInfo  Report_name="Query1.0" Query_name="Query1"
              Number_of_edges="1">
    <edgeInfo ordinal="0" Edge_name="columns"
Number_of_rowsets="3">
        <rowsetInfo  Rowset_name="Year"    id="0"
                     headerRowsetId="-1"   footerRowsetId="-1"
                     parentRowsetId="-1"   childRowsetId="1"
                     nextRowsetId="-1"     numColumns="1"
                     isMeasure="0">
            <columnInfo  name="Year"              label="Year"
                         isProperty="0"           type="string"
                         subType=""               nullsOk="false"
                         length="-1"              precision="0"
                         scale="0"                currencyCode=""/>
        </rowsetInfo>
        <rowsetInfo  Rowset_name="Product line" id="1"
                     headerRowsetId="-1"           footerRowsetId="-1"
                     parentRowsetId="0"            childRowsetId="2"
                     nextRowsetId="-1"             numColumns="1"
                     isMeasure="0">
            <columnInfo  name="Product line"      label="Product line"
                         isProperty="0"           type="string"
                         subType=""               nullsOk="false"
                         length="-1"              precision="0"
                         scale="0"                currencyCode=""/>
        </rowsetInfo>
        <rowsetInfo  Rowset_name="Revenue" id="2"
                     headerRowsetId="-1"   footerRowsetId="-1"
                     parentRowsetId="1"    childRowsetId="-1"
                     nextRowsetId="-1"     numColumns="1"
                     isMeasure="0">
            <columnInfo  name="Revenue"           label="Revenue"
                         isProperty="0"           type="double"
                         subType=""               nullsOk="true"
                         length="8"               precision="2"
                         scale="0"                currencyCode=""/>
        </rowsetInfo>
    </edgeInfo>
</datasetInfo>
```

The following is an example of a layout specification for a grouped list with footer report 130 shown in FIG. 4:

```
<queryResultDefinition name="Query1.0" refQuery="Query1">
    <edges>
        <edge name="columns">
            <edgeGroups>
```

-continued

```
<edgeGroup>
    <valueSets>
        <valueSet name="Year" refDataItem="Year">
            <groupFooter name="Year group footer">
                <dataItemRef refDataItem="Revenue"/>
            </groupFooter>
        </valueSet>
    </valueSets>
    <edgeGroups>
        <edgeGroup>
            <valueSets>
                <valueSet name="Product line"
                            refDataItem="Product line">
                    <groupFooter name="Product line group footer">
                        <dataItemRef refDataItem="Revenue"/>
                    </groupFooter>
                </valueSet>
            </valueSets>
            <edgeGroups>
                <edgeGroup>
                    <valueSets>
                        <valueSet name="Report summary">
                            <groupBody name=Report group body">
                                <dataItemRef refDataItem="Revenue"/>
                            </groupBody>
                        </valueSet>
                    </valueSets>
                </edgeGroup>
            </edgeGroups>
        </edgeGroup>
    </edgeGroups>
</edgeGroup>
        </edge>
    </edges>
</queryResultDefinition>
```

The following is an example of the corresponding dataset information for the grouped list with footer report 130 shown in FIG. 4:

```
<datasetInfo  Report_name="Query1.0" Query_name="Query1"
              Number_of_edges="1">
  <edgeInfo ordinal="0" name="columns" Number_of_rowsets="5">
    <rowsetInfo  name="Year" id="0"    headerRowsetId="-1"
                 footerRowsetId="1"    parentRowsetId="-1"
                 childRowsetId="2"     nextRowsetId="-1"
                 numColumns="1"        isMeasure="0">
      <columnInfo  name="Year"           label="Year"
                   isProperty="0"        type="string"
                   subType=""            nullsOk="false"
                   length="-1"           precision="0"
                   scale="0"             currencyCode=""/>
    </rowsetInfo>
    <rowsetInfo  name="Year group footer"   id="1"
                 headerRowsetId="-1"        footerRowsetId="-1"
                 parentRowsetId="-1"        childRowsetId="-1"
                 nextRowsetId="-1"          numColumns="1"
                 isMeasure="0">
      <columnInfo  name="Revenue"     label="Revenue"
                   isProperty="0"     type="double"
                   subType=""         nullsOk="true"
                   length="8"         precision="2"
                   scale="0"          currencyCode=""/>
    </rowsetInfo>
    <rowsetInfo  name="Product line"    id="2"
                 headerRowsetId="-1"    footerRowsetId="3"
                 parentRowsetId="0"     childRowsetId="4"
                 nextRowsetId="-1"      numColumns="1"
                 isMeasure="0">
      <columnInfo  name="Product line"   label="Product line"
                   isProperty="0"        type="string"
                   subType=""            nullsOk="false"
                   length="-1"           precision="0"
                   scale="0"             currencyCode=""/>
    </rowsetInfo>
    <rowsetInfo  name="Product line group footer" id="3"
                 headerRowsetId="-1"
                 footerRowsetId="-1"
                 parentRowsetId="0"
                 childRowsetId="-1"
                 nextRowsetId="-1"
                 numColumns="1"
                 isMeasure="0">
      <columnInfo  name="Revenue"     label="Revenue"
                   isProperty="0"     type="double"
                   subType=""         nullsOk="true"
                   length="8"         precision="2"
                   scale="0"          currencyCode=""/>
    </rowsetInfo>
    <rowsetInfo  name="Report summary"   id="4"
                 headerRowsetId="-1"     footerRowsetId="-1"
                 parentRowsetId="2"      childRowsetId="-1"
                 nextRowsetId="-1"       numColumns="1"
                 isMeasure="0">
      <columnInfo  name="Revenue"     label="Revenue"
                   isProperty="0"     type="double"
                   subType=""         nullsOk="true"
                   length="8"         precision="2"
                   scale="0"          currencyCode=""/>
    </rowsetInfo>
  </edgeInfo>
</datasetInfo>
```

The following is an example of a layout specification for a cross tab report 140 shown in FIG. 5:

```
<queryResultDefinition name="Query1.0" refQuery="Query1">
  <edges>
    <edge name="columns">
      <edgeGroups>
        <edgeGroup>
          <valueSets>
            <valueSet name="Product line" refDataItem="Product line">
              <properties>
                <property name="Member_caption"/>
              </properties>
            </valueSet>
          </valueSets>
        </edgeGroup>
      </edgeGroups>
    </edge>
    <edge name="rows">
      <edgeGroups>
        <edgeGroup>
          <valueSets>
            <valueSet name="Year" refDataItem="Year">
              <properties>
                <property name="Member_caption"/>
              </properties>
            </valueSet>
          </valueSets>
          <edgeGroups>
            <edgeGroup>
              <valueSets>
                <valueSet name="Quarter" refDataItem="Quarter">
                  <properties>
                    <property name="Member_caption"/>
                  </properties>
                </valueSet>
              </valueSets>
            </edgeGroup>
          </edgeGroups>
        </edgeGroup>
      </edgeGroups>
    </edge>
    <edge name="slicer">
      <edgeGroups>
        <edgeGroup>
          <valueSets>
            <valueSet name="Revenue" refDataItem="Revenue">
```

-continued

```
            <properties>
                <property name="Member_caption"/>
            </properties>
        </valueSet>
      </valueSets>
    </edgeGroup>
  </edgeGroups>
 </edge>
</edges>
</queryResultDefinition>
```

The following is an example of the corresponding dataset information for cross tab report 140 shown in FIG. 5:

```
<datasetInfo  Report_name="Query1.0" Query_name="Query1"
        Number_of_edges="3">
  <edgeInfo ordinal="0" name="columns" numRowsets="1">
    <rowsetInfo  name="Product line"     id="0"
                 headerRowsetId="-1"     footerRowsetId="-1"
                 parentRowsetId="-1"     childRowsetId="-1"
                 nextRowsetId="-1"       numColumns="2"
                 isMeasure="0">
      <columnInfo name="Product line_memberCaption"
                  label="Product line" isProperty="1"
                  type="string"          subType=""
                  nullsOk="false"        length="-1"
                  precision="0" scale="0"
                  currencyCode=""/>
      <columnInfo  name="Product line"    label="Product line"
                   isProperty="0"         type="string"
                   subType=""             nullsOk="false"
                   length="-1"            precision="0"
                   scale="0"              currencyCode=""/>
    </rowsetInfo>
  </edgeInfo>
  <edgeInfo ordinal="1" name="rows" numRowsets="2">
    <rowsetInfo  name="12"               id="0"
                 headerRowsetId="-1"     footerRowsetId="-1"
                 parentRowsetId="-1"     childRowsetId="1"
                 nextRowsetId="-1"       numColumns="2"
                 isMeasure="0">
      <columnInfo name="Year/_memberCaption"  label="Year"
                  isProperty="1"              type="string"
                  subType=""
                  nullsOk="false"
                  length="-1"                 precision="0"
                  scale="0"
                  currencyCode=""/>
      <columnInfo  name="Year"            label="Year"
                   isProperty="0"         type="string"
                   subType=""             nullsOk="false"
                   length="-1"            precision="0"
                   scale="0"              currencyCode=""/>
    </rowsetInfo>
    <rowsetInfo  name="Quarter"          id="1"
                 headerRowsetId="-1"     footerRowsetId="-1"
                 parentRowsetId="0"      childRowsetId="-1"
                 nextRowsetId="-1"       numColumns="2"
                 isMeasure="0">
      <columnInfo  name="Quarter/_memberCaption"
                   label="Quarter"
                   isProperty="1"
                   type="string"
                   subType=""
                   nullsOk="false"
                   length="-1"
                   precision="0"
                   scale="0"
                   currencyCode=""/>
      <columnInfo  name="Quarter"         label="Quarter"
                   isProperty="0"         type="string"
                   subType="" nullsOk="false"
                   length="-1"            precision="0"
                   scale="0"              currencyCode=""/>
    </rowsetInfo>
  </edgeInfo>
  <edgeInfo ordinal="2" name="slicer" numRowsets="1">
    <rowsetInfo  name="21"               id="0"
                 headerRowsetId="-1"     footerRowsetId="-1"
                 parentRowsetId="-1"     childRowsetId="-1"
                 nextRowsetId="-1"       numColumns="2"
                 isMeasure="1">
      <columnInfo  name="Revenue/_memberCaption"
                   label="Revenue"
                   isProperty="1"
                   type="string"
                   subType=""
                   nullsOk="false"
                   length="-1"
                   precision="0"
                   scale="0"
                   currencyCode=""/>
      <columnInfo  name="Revenue"         label="Revenue"
                   isProperty="0"         type="double"
                   subType=""             nullsOk="false"
                   length="8"             precision="2"
                   scale="0"              currencyCode=""/>
    </rowsetInfo>
  </edgeInfo>
  <cellRowsetInfo name="" numRows="0" numColumns="1">
    <columnInfo  name="value"            label="value"
                 isProperty="0"          type="double"
                 subType=""              nullsOk="true"
                 length="8"              precision="0"
                 scale="0"               currencyCode=""/>
  </cellRowsetInto>
</datasetInfo>
```

Partial Dataset

Figure 12:
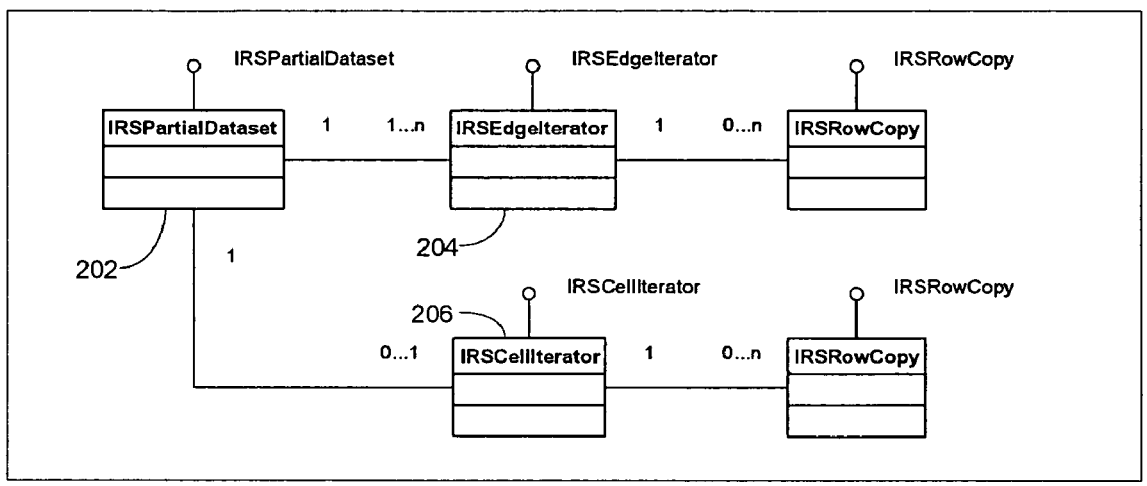
FIG. 12 shows in an object diagram an example of a partial dataset object and its child objects, in accordance with an embodiment of the present invention.

All of the above objects together provide the information necessary for a rendering component to relate the various RSAPI objects with the original report-layout specification, in addition to providing column (data item) information such as data type, scale, etc. An IRSPartialDataset object, on the other hand, provides a rendering component with access to the actual data values associated with each of the individual rowsets. The IRSPartialDataset class is named as such because the intent is that a rendering component retrieves a partial set of data from the overall dataset (set of data) returned by a query to match what can be displayed in a display device. It is possible to retrieve the entire data set in a single partial dataset, such as when rendering a PDF report. FIG. 12 shows an example of the data retrieval objects of the RSAPI, in accordance with an embodiment of the present invention.

A partial dataset 202 is created from a master dataset by specifying a range of coordinates for each edge of the result set. A partial dataset 202 then provides access to edge iterators 204 to access the data along each edge of the result set and a cell iterator 206 to access cell values in the case of a multi-edge (cross tab) report. A partial dataset 202 may also be empty, a condition which may occur when a query returns no data and is obtained via an IsEmpty method of an IRSPartialDataset object.

Edge Iterators 204

From a partial dataset it is possible to create one or more IRSEdgeIterator objects 204 per edge, as well as one or more IRSCellIterator objects 206 for the values of a multi-edge report.

An IRSEdgeIterator object 204 can be used to navigate all of the rows of all of the rowsets of an edge present within the scope of the partial dataset from which it is created. All of the rows of data are contained within a single, virtual rowset. Each row is associated with a particular rowset; its ancestor row within the result set is also identified. A rendering component uses the ancestor information to determine parent/ child relationships within the data. The parent row of a particular row may be within any rowset in the same edge that in the IRSRowsetLayout information 190 is sibling or parent of the current rowset.

The following constructs are used to identify the position of a row within a virtual rowset:
1. Rowset ID.
   The identifier of the logical rowset to which a row of data belongs, representing the index in the edge's vector of IRSRowsetInfo objects 184.
2. Row Number.
   The row's unique identifier in the context of the entire edge, not just the partial dataset with which the current iterator is associated. Row numbers are required to be unique within the scope of all rows for the rowset for the entire edge. Each row in an edge rowset is uniquely identified by its (rowset id, row #) tuple.
3. Detail Row Number.
   A unique, sequential value used to identify rows of detail data along an edge. They start at 1 and increment by 1. For a partial dataset created relative to end of data, detail row numbers start at −1 at EOD and decrement by 1 towards the start of the rowset. A detail row number of 0 indicates a non-detail row of data. A row of data from a summary (header/footer) rowset cannot represent detail data.
4. Coordinate.
   A unique value along an edge that is used to correlate a row along an edge with a row of data in the cell rowset. A coordinate from each edge is required to uniquely identify a single row in the cell rowset. Cell coordinates can be any value, but are unique along an edge. A cell rowset is required to return data in row-major order. A coordinate of −1 indicates that a row of data has no corresponding row in the cell rowset.
5. Row Ordinal.
   A row's unique identifier within an entire edge rowset. The ordinal is simply the tuple comprised of a rowset ID and row number. The RSOrdinal class encapsulates the two pieces of information.

Edge Rowset Iteration

A client application uses the row ordinal and ancestor id to guide its navigation of an edge's virtual rowset. The application has available to it a small set of navigational methods:
   ToFirstRow
   ToLastRow
   Next
   Previous The above 4 methods provide navigation relative to the virtual partial rowset independent of the rowset with which a row of data is associated.
   Goto Allows navigation relative to a row ordinal (rowset ID and row number).

An edge iterator 204 provides access to the following positional information:
   Number of rows in the virtual rowset.
   Current row number.
   Rowset ID of the current row.
   Detail row number of the current row.
   Ordinal of the current row.
   Ordinal of the row's ancestor.
   Edge coordinates of the current row.

The above navigational and positional methods are combined by a rendering component in order to navigate the values along an edge in order to follow nesting relationships and to associate a row of data back to its rowset information and as a consequence, its corresponding element in the original report layout specification. A rendering component can also use ancestry and rowset information to recognize both ragged and unbalanced paths within a result set.

Positioning Within an Edge Rowset, PDS Created Relative to EOD

When creating a partial dataset from a master dataset, the starting detail row number and number of detail rows for each edge is specified. A negative number of detail row numbers is interpreted to indicate that the first value (row number) is relative to the end of the corresponding edge. For example, the pair of values (100, −20) indicates a partial dataset containing 20 details rows ending at the 100$^{th}$ row from the end of data The IRSEdgeIterator:GetRowNumber method for the edge of a partial dataset created relative to end of data returns negative row numbers, the last of which is −1. Row numbers are decremented by 1 towards the beginning of the partial dataset. Using the previously stated example, the edge rowset would begin at −20 and end at −1. Note that the non-detail row numbers are also affected by creating a partial dataset relative to EOD. That is, the last row in a rowset is numbered −1 and previous row numbers are decremented by 1.

Cell Rowset Iteration

In the case of a multi-edge (typically cross tab) report, a cell rowset iterator is available for a partial dataset. The cells of the N-dimensional space are presented in a single rowset of data in row-major order. The same next/previous/first/last methods are available as for the edge iterator class. The Goto method accepts an array of edge coordinates, one for each edge, to position on the row that represents the intersection of the specified edge coordinates. From a row within the cell rowset it is possible to obtain an array of corresponding edge coordinates. With these two mechanisms, it is possible for a rendering component to associated edge rows with cell values with either the edges or the cells as the starting point.

Retrieving Column Data and Column States

Column values are retrieved from an iterator object either by retrieving them one by one or by retrieving all column values at once. Each column value is returned by an IRSColumnValue object that returns methods to retrieve the following information regarding a column's value:
   State.
   Data type, precision, and scale.
   Locale.
   Currency code.
   Format.
   Unit of measure.
   Value.

In the case of metadata rich data sources (e.g., OLAP data sources), information such as locale, currency code, format and unit of measure may be available. This information is supplied to the rendering component to allow this information to be applied when formatting the data Copying a Row of Data The column data retrieved from the RSAPI remains valid while the iterator remains on the row from which the data is retrieved. Once the iterator is re-positioned, the data is no longer guaranteed to remain valid. For this reason, it is possible from both IRSCellIterator 206 and IRSEdgeIterator 204 objects to obtain a copy of a row of data that remains valid for its lifetime. This facility is useful for applications which need to navigate from one row of data to another in an edge or cell rowset and render a group of values at one time.

Partial Dataset Context

When navigating through a report, a user may move in a variety of different manners—up, down, left, right, top, bottom, next page, etc. The rendering component obtains the set of data that corresponds the user's request and then render the results to the output device. In many reports, especially grouped list reports or nested cross tabs (either multiple levels of a single dimension and/or different dimensions), it is desirable to provide the outer/higher levels of nesting in the output to provide the necessary context to the end user in the new page of data.

For example, if a user was looking at a report that showed on one edge the nesting of USA/California/San Francisco, if they paged down to see Los Angeles, they would expect to see the nesting USA/California/Los Angeles. However, if the row for Los Angeles was the first row in the new partial dataset, that context would not be part of the partial dataset. To provide the necessary context would require the rendering component to maintain the previous result set and match the two partial datasets. However, this approach would not work if a user paged to the bottom, or to an arbitrary location within a result set. In these cases, the rendering component would have lost the outer/higher level context for lower/inner level values.

The RSAPI provides a facility for obtaining the outer/higher level context values when creating a partial dataset. In addition, it is possible to request that that the partial dataset, in case of a multi-edge report, that the partial dataset contain values in the cell iterator that are associated with the context values on the edges.

Below are described the various types of context which can be included as part of the data within a partial dataset. In each case, it is possible to request that in the case of a multi-edge report (typically a cross tab) that the corresponding values be returned as rows in the partial dataset's cell iterator.

| Context Type | Description. |
| --- | --- |
| None. | Do not provide any context. |
| Rowset context. | For the first detail row of each edge iterator in the partial dataset, amend the beginning of the edge iterator with a single row from each non-detail, non-summary rowset in which the detail row is nested. Rows of context data are distinguished as non-detail rows that occur in the partial data set prior to the first detail row. |
| Rowset context with headers/footers. | Amend the rowset context with all rows of all related header and footer rowsets. |
| Rowset context with headers/footers and 1<sup>st</sup> detail row. | The same as "Rowset context with headers/footers," except that the first detail rows for the nested rowset is also included. |

The navigational methods of the edge iterator listed in the previous section (ToFirstRow, ToLastRow, Next, Previous, and Goto) return a status of "context" when they position an iterator on a context row, allowing an application to determine immediately what type of row they have positioned on.

Multi-Dimensional Properties

If multi-dimensional properties are requested as part of a value set in the original report layout specification, the property values appear in additional columns within the rowset, one column per property.

Master/Detail Navigation

Master/detail relationships are not contained within the original report layout specification, but are described within the queries used to populate the original report layout specifications. When the original report layout specification actually involves multiple report layouts that are related by query-specified links, the root master dataset provides access to a vector of detail master datasets. When positioned on a row of the master result set, a rendering component can execute one of the detail queries using values from the master result set. The information regarding which columns provide the parameter values for the execution of the detail query is not provided as part of the RSAPI and must be provided to the rendering component via other means.

It is possible for master/detail relationships to be nested to any arbitrary depth.

Examples of Partial Datasets

The following is an example of the corresponding data contained within a single partial dataset for the detail list report 110 in FIG. 2:

```
<partialDataset version="3.0">
  <edge ordinal="0">
    <row detailRow="1" rowsetId="0" rowsetRow="1" ancestorRowsetId="-1"
         ancestorRowsetRow="-1">
      <column name="Year" value="2004" state="OK" type="string"/>
      <column name="Product line" value="Camping Equipment" state="OK"
              type="string"/>
      <column name="Revenue" value="20471328.88" state="OK"
              type="double"currency="USD"/>
    </row>
    <row detailRow="2" rowsetId="0" rowsetRow="2" ancestorRowsetId="-1"
         ancestorRowsetRow="-1">
      <column name="Year" value="2004" state="OK" type="string"/>
      <column name="Product line" value="Golf Equipment" state="OK"
              type="string"/>
      <column name="Revenue" value="5597980.86" state="OK" type="double"
              currency="USD"/>
    </row>
    <row detailRow="3" rowsetId="0" rowsetRow="3" ancestorRowsetId="-1"
         ancestorRowsetRow="-1">
      <column name="Year" value="2004" state="OK" type="string"/>
      <column name="Product line" value="Mountaineering Equipment"
              state="OK" type="string"/>
      <column name="Revenue" value="0" state="OK" type="integer"
              currency="USD"/>
    </row>
    <row detailRow="4" rowsetId="0" rowsetRow="4" ancestorRowsetId="-1"
         ancestorRowsetRow="-1">
      <column name="Year" value="2004" state="OK" type="string"/>
      <column name="Product line" value="Outdoor Protection" state="OK"
              type="string"/>
      <column name="Revenue" value="1536456.24" state="OK" type="double"
              currency="USD"/>
    </row>
    <row detailRow="5" rowsetId="0" rowsetRow="5" ancestorRowsetId="-1"
         ancestorRowsetRow="-1">
      <column name="Year" value="2004" state="OK" type="string"/>
      <column name="Product line" value="Personal Accessories"
              state="OK" type="string"/>
      <column name="Revenue" value="7144797.52" state="OK" type="double"
              currency="USD"/>
    </row>
    <row detailRow="6" rowsetId="0" rowsetRow="6" ancestorRowsetId="-1"
         ancestorRowsetRow="-1">
      <column name="Year" value="2005" state="OK" type="string"/>
      <column name="Product line" value="Camping Equipment" state="OK"
              type="string"/>
      <column name="Revenue" value="31373606.46" state="OK"
              type="double" currency="USD"/>
    </row>
    <row detailRow="7" rowsetId="0" rowsetRow="7" ancestorRowsetId="-1"
```

-continued

```
ancestorRowsetRow="-1">
    <column name="Year" value="2005" state="OK" type="string"/>
    <column name="Product line" value="Golf Equipment" state="OK"
            type="string"/>
    <column name="Revenue" value="9598268.88" state="OK" type="double"
            currency="USD"/>
</row>
<row detailRow="8" rowsetId="0" rowsetRow="8" ancestorRowsetId="-1"
    ancestorRowsetRow="-1">
    <column name="Year" value="2005" state="OK" type="string"/>
    <column name="Product line" value="Mountaineering Equipment"
            state="OK" type="string"/>
    <column name="Revenue" value="9642674.54" state="OK" type="double"
            currency="USD"/>
</row>
<row detailRow="9" rowsetId="0" rowsetRow="9" ancestorRowsetId="-1"
    ancestorRowsetRow="-1">
    <column name="Year" value="2005" state="OK" type="string"/>
    <column name="Product line" value="Outdoor Protection" state="OK"
            type="string"/>
    <column name="Revenue" value="988230.64" state="OK" type="double"
            currency="USD"/>
</row>
<row detailRow="10" rowsetId="0" rowsetRow="10"
    ancestorRowsetId="-1" ancestorRowsetRow="-1">
    <column name="Year" value="2005" state="OK" type="string"/>
    <column name="Product line" value="Personal Accessories"
            state="OK" type="string"/>
    <column name="Revenue" value="10955708.04" state="OK"
            type="double" currency="USD"/>
</row>
<row detailRow="11" rowsetId="0" rowsetRow="11"
    ancestorRowsetId="-1" ancestorRowsetRow="-1">
    <column name="Year" value="2006" state="OK" type="string"/>
    <column name="Product line" value="Camping Equipment" state="OK"
            type="string"/>
    <column name="Revenue" value="37869055.58" state="OK"
            type="double" currency="USD"/>
</row>
<row detailRow="12" rowsetId="0" rowsetRow="12"
    ancestorRowsetId="-1" ancestorRowsetRow="-1">
    <column name="Year" value="2006" state="OK" type="string"/>
    <column name="Product line" value="Golf Equipment" state="OK"
            type="string"/>
    <column name="Revenue" value="10709215.84" state="OK"
            type="double" currency="USD"/>
</row>
<row detailRow="13" rowsetId="0" rowsetRow="13"
    ancestorRowsetId="-1" ancestorRowsetRow="-1">
    <column name="Year" value="2006" state="OK" type="string"/>
    <column name="Product line" value="Mountaineering Equipment"
            state="OK" type="string"/>
    <column name="Revenue" value="11248676.06" state="OK"
            type="double" currency="USD"/>
</row>
<row detailRow="14" rowsetId="0" rowsetRow="14"
    ancestorRowsetId="-1" ancestorRowsetRow="-1">
    <column name="Year" value="2006" state="OK" type="string"/>
    <column name="Product line" value="Outdoor Protection" state="OK"
            type="string"/>
    <column name="Revenue" value="646428.04" state="OK" type="double"
            currency="USD"/>
</row>
<row detailRow="15" rowsetId="0" rowsetRow="15"
    ancestorRowsetId="-1" ancestorRowsetRow="-1">
    <column name="Year" value="2006" state="OK" type="string"/>
    <column name="Product line" value="Personal Accessories"
            state="OK" type="string"/>
    <column name="Revenue" value="13793960.3" state="OK"
            type="double" currency="USD"/>
</row>
</edge>
</partialDataset>
```

The following is an example of the corresponding data contained within a single partial dataset for the grouped list report 120 in FIG. 3:

```
<partialDataset version="3.0">
  <edge ordinal="0">
    <row detailRow="0" rowsetId="0" rowsetRow="1"
        ancestorRowsetId="-1" ancestorRowsetRow="-1">
      <column name="Year" value="2004" state="OK" type="string"/>
    </row>
    <row detailRow="0" rowsetId="1" rowsetRow="1"
        ancestorRowsetId="0" ancestorRowsetRow="1">
      <column name="Product line" value="Camping Equipment"
              state="OK" type="string"/>
    </row>
    <row detailRow="1" rowsetId="2" rowsetRow="1"
        ancestorRowsetId="1" ancestorRowsetRow="1">
      <column name="Revenue" value="20471328.88" state="OK"
              type="string" currency="USD" />
    </row>
    <row detailRow="0" rowsetId="1" rowsetRow="2"
        ancestorRowsetId="0" ancestorRowsetRow="1">
      <column name="Product line" value="Golf Equipment"
              state="OK" type="string"/>
    </row>
    <row detailRow="2" rowsetId="2" rowsetRow="2"
        ancestorRowsetId="1" ancestorRowsetRow="2">
      <column name="Revenue" value="5597980.86" state="OK"
              type="string"
              currency="USD" />
      </column>
    </row>
    <row detailRow="0" rowsetId="1" rowsetRow="3"
        ancestorRowsetId="0" ancestorRowsetRow="1">
      <column name="Product line" value="Mountaineering Equipment"
              state="OK" type="string"/>
    </row>
    <row detailRow="3" rowsetId="2" rowsetRow="3"
        ancestorRowsetId="1" ancestorRowsetRow="3">
      <column name="Revenue" value="0" state="OK" type="integer"
              currency="USD" />
      </column>
    </row>
    <row detailRow="0" rowsetId="1" rowsetRow="4"
        ancestorRowsetId="0" ancestorRowsetRow="1">
      <column name="Product line" value="Outdoor Protection"
              state="OK" type="string"/>
    </row>
    <row detailRow="4" rowsetId="2" rowsetRow="4"
        ancestorRowsetId="1" ancestorRowsetRow="4">
      <column name="Revenue" value="1536456.24" state="OK"
              type="string"
              currency="USD" />
      </column>
    </row>
```

-continued

```
        <row detailRow="0" rowsetId="1" rowsetRow="5" ancestorRowsetId="0"
              ancestorRowsetRow="1">
            <column name="Product line" value="Personal Accessories"
                    state="OK" type="string"/>
        </row>
        <row detailRow="5" rowsetId="2" rowsetRow="5" ancestorRowsetId="1"
              ancestorRowsetRow="5">
            <column name="Revenue" value="7144797.52" state="OK" type="string"
                    currency="USD" />
            </column>
        </row>
        <row detailRow="0" rowsetId="0" rowsetRow="2" ancestorRowsetId="-1"
              ancestorRowsetRow="-1">
            <column name="Year" value="2005" state="OK" type="string"/>
        </row>
        <row detailRow="0" rowsetId="1" rowsetRow="6" ancestorRowsetId="0"
              ancestorRowsetRow="2">
            <column name="Product line" value="Camping Equipment" state="OK"
                    type="string"/>
        </row>
        <row detailRow="6" rowsetId="2" rowsetRow="6" ancestorRowsetId="1"
              ancestorRowsetRow="6">
            <column name="Revenue" value="31373606.46" state="OK"
                    type="string" currency="USD" />
            </column>
        </row>
        <row detailRow="0" rowsetId="1" rowsetRow="7" ancestorRowsetId="0"
              ancestorRowsetRow="2">
            <column name="Product line" value="Golf Equipment" state="OK"
                    type="string"/>
        </row>
        <row detailRow="7" rowsetId="2" rowsetRow="7" ancestorRowsetId="1"
              ancestorRowsetRow="7">
            <column name="Revenue" value="9598268.88" state="OK" type="string"
                    currency="USD" />
            </column>
        </row>
        <row detailRow="0" rowsetId="1" rowsetRow="8" ancestorRowsetId="0"
              ancestorRowsetRow="2">
            <column name="Product line" value="Mountaineering Equipment"
                    state="OK" type="string"/>
        </row>
        <row detailRow="8" rowsetId="2" rowsetRow="8" ancestorRowsetId="1"
              ancestorRowsetRow="8">
            <column name="Revenue" value="9642674.54" state="OK" type="string"
                    currency="USD" />
            </column>
        </row>
        <row detailRow="0" rowsetId="1" rowsetRow="9" ancestorRowsetId="0"
              ancestorRowsetRow="2">
            <column name="Product line" value="Outdoor Protection" state="OK"
                    type="string"/>
        </row>
        <row detailRow="9" rowsetId="2" rowsetRow="9" ancestorRowsetId="1"
              ancestorRowsetRow="9">
            <column name="Revenue" value="988230.64" state="OK" type="string"
                    currency="USD" />
            </column>
        </row>
        <row detailRow="0" rowsetId="1" rowsetRow="10" ancestorRowsetId="0"
              ancestorRowsetRow="2">
            <column name="Product line" value="Personal Accessories"
                    state="OK" type="string"/>
        </row>
        <row detailRow="10" rowsetId="2" rowsetRow="10" ancestorRowsetId="1"
              ancestorRowsetRow="10">
            <column name="Revenue" value="10955708.04" state="OK"
                    type="string" currency="USD" />
            </column>
        </row>
        <row detailRow="0" rowsetId="0" rowsetRow="3" ancestorRowsetId="-1"
              ancestorRowsetRow="-1">
            <column name="Year" value="2006" state="OK" type="string"/>
        </row>
        <row detailRow="0" rowsetId="1" rowsetRow="11" ancestorRowsetId="0"
              ancestorRowsetRow="3">
            <column name="Product line" value="Camping Equipment" state="OK"
                    type="string"/>
        </row>
        <row detailRow="11" rowsetId="2" rowsetRow="11" ancestorRowsetId="1"
              ancestorRowsetRow="11">
            <column name="Revenue" value="37869055.58" state="OK"
                    type="string" currency="USD" />
            </column>
        </row>
        <row detailRow="0" rowsetId="1" rowsetRow="12" ancestorRowsetId="0"
              ancestorRowsetRow="3">
            <column name="Product line" value="Golf Equipment" state="OK"
                    type="string"/>
        </row>
        <row detailRow="12" rowsetId="2" rowsetRow="12" ancestorRowsetId="1"
              ancestorRowsetRow="12">
            <column name="Revenue" value="10709215.84" state="OK"
                    type="string" currency="USD" />
            </column>
        </row>
        <row detailRow="0" rowsetId="1" rowsetRow="13" ancestorRowsetId="0"
              ancestorRowsetRow="3">
            <column name="Product line" value="Mountaineering Equipment"
                    state="OK" type="string"/>
        </row>
        <row detailRow="13" rowsetId="2" rowsetRow="13" ancestorRowsetId="1"
              ancestorRowsetRow="13">
            <column name="Revenue" value="11248676.06" state="OK"
                    type="string" currency="USD" />
            </column>
        </row>
        <row detailRow="0" rowsetId="1" rowsetRow="14" ancestorRowsetId="0"
              ancestorRowsetRow="3">
            <column name="Product line" value="Outdoor Protection" state="OK"
                    type="string"/>
        </row>
        <row detailRow="14" rowsetId="2" rowsetRow="14" ancestorRowsetId="1"
              ancestorRowsetRow="14">
            <column name="Revenue" value="646428.04" state="OK" type="string"
                    currency="USD" />
            </column>
        </row>
        <row detailRow="0" rowsetId="1" rowsetRow="15" ancestorRowsetId="0"
              ancestorRowsetRow="3">
            <column name="Product line" value="Personal Accessories"
                    state="OK" type="string"/>
        </row>
        <row detailRow="15" rowsetId="2" rowsetRow="15"
```

```
ancestorRowsetId="1"
        ancestorRowsetRow="15">
    <column name="Revenue" value="13793960.3" state="OK"
type="string"
                currency="USD" />
    </column>
    </row>
  </edge>
</partialDataset>
```

The following is an example of the corresponding data contained within a single partial dataset for the grouped list with footers report 130 in FIG. 4:

```
<partialDataset version="3.0">
  <edge ordinal="0">
    <row detailRow="0" rowsetId="0" rowsetRow="1"
ancestorRowsetId="-1"
        ancestorRowsetRow="-1">
      <column name="Year" value="2004" state="OK" type="string"/>
    </row>
    <row detailRow="0" rowsetId="2" rowsetRow="1"
ancestorRowsetId="0"
        ancestorRowsetRow="1">
      <column name="Product line" value="Camping Equipment"
            state="OK" type="string"/>
    </row>
    <row detailRow="1" rowsetId="4" rowsetRow="1"
ancestorRowsetId="2"
        ancestorRowsetRow="1">
      <column name="Revenue" value="20471329" state="OK"
type="double"
                currency="USD"/>
    </row>
    <row detailRow="0" rowsetId="2" rowsetRow="2"
ancestorRowsetId="0"
        ancestorRowsetRow="1">
      <column name="Product line" value="Golf Equipment"
state="OK"
                type="string"/>
    </row>
    <row detailRow="2" rowsetId="4" rowsetRow="2"
ancestorRowsetId="2"
        ancestorRowsetRow="2">
      <column name="Revenue" value="5597980.9" state="OK"
type="double"
                currency="USD"/>
    </row>
    <row detailRow="0" rowsetId="2" rowsetRow="3"
ancestorRowsetId="0"
        ancestorRowsetRow="1">
      <column name="Product line" value="Mountaineering
Equipment"
            state="OK" type="string"/>
    </row>
    <row detailRow="3" rowsetId="4" rowsetRow="3"
ancestorRowsetId="2"
        ancestorRowsetRow="3">
      <column name="Revenue" value="0" state="OK" type="integer"
                currency="USD"/>
    </row>
    <row detailRow="0" rowsetId="2" rowsetRow="4"
ancestorRowsetId="0"
        ancestorRowsetRow="1">
      <column name="Product line" value="Outdoor Protection"
state="OK"
                type="string"/>
    </row>
    <row detailRow="4" rowsetId="4" rowsetRow="4"
ancestorRowsetId="2"
        ancestorRowsetRow="4">
      <column name="Revenue" value="1536456.2" state="OK"
type="double"
                currency="USD"/>
    </row>
    <row detailRow="0" rowsetId="2" rowsetRow="5"
ancestorRowsetId="0"
        ancestorRowsetRow="1">
      <column name="Product line" value="Personal Accessories"
            state="OK" type="string"/>
    </row>
    <row detailRow="5" rowsetId="4" rowsetRow="5"
ancestorRowsetId="2"
        ancestorRowsetRow="5">
      <column name="Revenue" value="7144797.5" state="OK"
type="double"
                currency="USD"/>
    </row>
    <row detailRow="0" rowsetId="3" rowsetRow="1"
ancestorRowsetId="0"
        ancestorRowsetRow="1">
      <column name="Revenue" value="34750564" state="OK"
type="double"
                currency="USD"/>
    </row>
    <row detailRow="0" rowsetId="0" rowsetRow="2"
ancestorRowsetId="-1"
        ancestorRowsetRow="-1">
      <column name="Year" value="2005" state="OK" type="string"/>
    </row>
    <row detailRow="0" rowsetId="2" rowsetRow="6"
ancestorRowsetId="0"
        ancestorRowsetRow="2">
      <column name="Product line" value="Camping Equipment"
state="OK"
                type="string"/>
    </row>
    <row detailRow="6" rowsetId="4" rowsetRow="6"
ancestorRowsetId="2"
        ancestorRowsetRow="6">
      <column name="Revenue" value="31373606" state="OK"
type="double"
                currency="USD"/>
    </row>
    <row detailRow="0" rowsetId="2" rowsetRow="7"
ancestorRowsetId="0"
        ancestorRowsetRow="2">
      <column name="Product line" value="Golf Equipment"
state="OK"
                type="string"/>
    </row>
    <row detailRow="7" rowsetId="4" rowsetRow="7"
ancestorRowsetId="2"
        ancestorRowsetRow="7">
      <column name="Revenue" value="9598268.9" state="OK"
type="double"
                currency="USD"/>
    </row>
    <row detailRow="0" rowsetId="2" rowsetRow="8"
ancestorRowsetId="0"
        ancestorRowsetRow="2">
      <column name="Product line" value="Mountaineering
Equipment"
            state="OK" type="string"/>
    </row>
    <row detailRow="8" rowsetId="4" rowsetRow="8"
ancestorRowsetId="2"
        ancestorRowsetRow="8">
      <column name="Revenue" value="9642674.5" state="OK"
type="double"
                currency="USD"/>
    </row>
    <row detailRow="0" rowsetId="2" rowsetRow="9"
ancestorRowsetId="0"
        ancestorRowsetRow="2">
      <column name="Product line" value="Outdoor Protection"
state="OK"
                type="string"/>
    </row>
    <row detailRow="9" rowsetId="4" rowsetRow="9"
ancestorRowsetId="2"
        ancestorRowsetRow="9">
      <column name="Revenue" value="988230.64" state="OK"
type="double"
                currency="USD"/>
    </row>
```

```
        <row detailRow="0" rowsetId="2" rowsetRow="10"
ancestorRowsetId="0"
                ancestorRowsetRow="2">
                <column name="Product line" value="Personal Accessories"
                        state="OK" type="string"/>
        </row>
        <row detailRow="10" rowsetId="4" rowsetRow="10"
ancestorRowsetId="2"
                ancestorRowsetRow="10">
                <column name="Revenue" value="10955708" state="OK"
type="double"
                        currency="USD"/>
        </row>
        <row detailRow="0" rowsetId="3" rowsetRow="2"
ancestorRowsetId="0"
                ancestorRowsetRow="2">
                <column name="Revenue" value="62558489" state="OK"
type="double"
                        currency="USD"/>
        </row>
        <row detailRow="0" rowsetId="0" rowsetRow="3"
ancestorRowsetId="-1"
                ancestorRowsetRow="-1">
                <column name="Year" value="2006" state="OK" type="string"/>
        </row>
        <row detailRow="0" rowsetId="2" rowsetRow="11"
ancestorRowsetId="0"
                ancestorRowsetRow="3">
                <column name="Product line" value="Camping Equipment"
state="OK"
                        type="string"/>
        </row>
        <row detailRow="11" rowsetId="4" rowsetRow="11"
ancestorRowsetId="2"
                ancestorRowsetRow="11">
                <column name="Revenue" value="37869056" state="OK"
type="double"
                        currency="USD"/>
        </row>
        <row detailRow="0" rowsetId="2" rowsetRow="12"
ancestorRowsetId="0"
                ancestorRowsetRow="3">
                <column name="Product line" value="Golf Equipment"
state="OK"
                        type="string"/>
        </row>
        <row detailRow="12" rowsetId="4" rowsetRow="12"
ancestorRowsetId="2"
                ancestorRowsetRow="12">
                <column name="Revenue" value="10709216" state="OK"
type="double"
                        currency="USD"/>
        </row>
        <row detailRow="0" rowsetId="2" rowsetRow="13"
ancestorRowsetId="0"
                ancestorRowsetRow="3">
                <column name="Product line" value="Mountaineering
Equipment"
                        state="OK" type="string"/>
        </row>
        <row detailRow="13" rowsetId="4" rowsetRow="13"
ancestorRowsetId="2"
                ancestorRowsetRow="13">
                <column name="Revenue" value="11248676" state="OK"
type="double"
                        currency="USD"/>
        </row>
        <row detailRow="0" rowsetId="2" rowsetRow="14"
ancestorRowsetId="0"
                ancestorRowsetRow="3">
                <column name="Product line" value="Outdoor Protection"
state="OK"
                        type="string"/>
        </row>
        <row detailRow="14" rowsetId="4" rowsetRow="14"
ancestorRowsetId="2"
                ancestorRowsetRow="14">
                <column name="Revenue" value="646428.04" state="OK"
type="double"
                        currency="USD"/>
        </row>
        <row detailRow="0" rowsetId="2" rowsetRow="15"
ancestorRowsetId="0"
                ancestorRowsetRow="3">
                <column name="Product line" value="Personal Accessories"
                        state="OK" type="string"/>
        </row>
        <row detailRow="15" rowsetId="4" rowsetRow="15"
ancestorRowsetId="2"
                ancestorRowsetRow"15">
                <column name="Revenue" value="13793960" state="OK"
type="double"
                        currency="USD"/>
        </row>
        <row detailRow="0" rowsetId="3" rowsetRow="3"
ancestorRowsetId="0"
                ancestorRowsetRow="3">
                <column name="Revenue" value="74267336" state="OK"
type="double"
                        currency="USD"/>
        </row>
        <row detailRow="0" rowsetId="1" rowsetRow="1"
ancestorRowsetId="-1"
                ancestorRowsetRow="-1">
                <column name="Revenue" value="1.7157639e+008" state="OK"
                        type="double"
                        currency="USD"/>
        </row>
    </edge>
</partialDataset>
```

The following is an example of the corresponding data contained within a single partial dataset for the cross tab report 140 in FIG. 5:

```
<partialDataset version="3.0">
    <edge ordinal="0">
        <row detailRow="1" rowsetId="0" rowsetRow="1"
ancestorRowsetId="-1"
                ancestorRowsetRow="-1" cellCoordinate="0">
                <column name="Product line_memberCaption"
                        value="Camping Equipment" state="OK"
type="string"/>
                <column name="Product line" value="Camping Equipment"
state="OK"
                        type="string"/>
        </row>
        <row detailRow="2" rowsetId="0" rowsetRow="2"
ancestorRowsetId="-1"
                ancestorRowsetRow="-1" cellCoordinate="1">
                <column name="Product line_memberCaption" value="Golf
Equipment"
                        state="OK" type="string"/>
                <column name="Product line" value="Golf Equipment"
state="OK"
                        type="string"/>
        </row>
        <row detailRow="3" rowsetId="0" rowsetRow="3"
ancestorRowsetId="-1"
                ancestorRowsetRow="-1" cellCoordinate="2">
                <column name="Product line_memberCaption"
                        value="Mountaineering Equipment" state="OK"
                        type="string"/>
                <column name="Product line" value="Mountaineering
Equipment"
                        state="OK" type="string"/>
        </row>
        <row detailRow="4" rowsetId="0" rowsetRow="4"
ancestorRowsetId="-1"
                ancestorRowsetRow="-1" cellCoordinate="3">
                <column name="Product line_memberCaption"
                        value="Outdoor Protection" state="OK"
type="string"/>
                <column name="Product line" value="Outdoor Protection"
                        state="OK" type="string"/>
        </row>
```

```
        <row detailRow="5" rowsetId="0" rowsetRow="5"
ancestorRowsetId="-1"
            ancestorRowsetRow="-1" cellCoordinate="4">
          <column name="Product line_memberCaption"
              value="Personal Accessories" state="OK"
type="string"/>
          <column name="Product line" value="Personal Accessories"
              state="OK" type="string"/>
        </row>
      </edge>
      <edge ordinal="1">
        <row detailRow="0" rowsetId="0" rowsetRow="1"
ancestorRowsetId="-1"
            ancestorRowsetRow="-1" cellCoordinate="-1">
          <column name="Year_memberCaption" value="2004"
              state="OK"
              type="string"/>
          <column name="Year" value="2004" state="OK"
type="string"/>
        </row>
        <row detailRow="1" rowsetId="1" rowsetRow="1"
ancestorRowsetId="0"
            ancestorRowsetRow="1" cellCoordinate="0">
          <column name="Quarter_memberCaption" value="2004 Q 1"
state="OK"
              type="string"/>
          <column name="Quarter" value="2004 Q 1" state="OK"
              type="string"/>
        </row>
        <row detailRow="2" rowsetId="1" rowsetRow="2"
ancestorRowsetId="0"
            ancestorRowsetRow="1" cellCoordinate="1">
          <column name="Quarter_memberCaption" value="2004 Q 2"
state="OK"
              type="string"/>
          <column name="Quarter" value="2004 Q 2" state="OK"
              type="string"/>
        </row>
        <row detailRow="3" rowsetId="1" rowsetRow="3"
ancestorRowsetId="0"
            ancestorRowsetRow="1" cellCoordinate="2">
          <column name="Quarter_memberCaption" value="2004 Q 3"
state="OK"
              type="string"/>
          <column name="Quarter" value="2004 Q 3" state="OK"
              type="string"/>
        </row>
        <row detailRow="4" rowsetId="1" rowsetRow="4"
ancestorRowsetId="0"
            ancestorRowsetRow="1" cellCoordinate="3">
          <column name="Quarter_memberCaption" value="2004 Q 4"
state="OK"
              type="string"/>
          <column name="Quarter" value="2004 Q 4" state="OK"
              type="string"/>
        </row>
        <row detailRow="0" rowsetId="0" rowsetRow="2"
ancestorRowsetId="-1"
            ancestorRowsetRow="-1" cellCoordinate="-1">
          <column name="Year_memberCaption" value="2005"
              state="OK"
              type="string"/>
          <column name="Year" value="2005" state="OK"
type="string"/>
        </row>
        <row detailRow="5" rowsetId="1" rowsetRow="5"
ancestorRowsetId="0"
            ancestorRowsetRow="2" cellCoordinate="4">
          <column name="Quarter_memberCaption" value="2005 Q 1"
state="OK"
              type="string"/>
          <column name="Quarter" value="2005 Q 1" state="OK"
              type="string"/>
        </row>
        <row detailRow="6" rowsetId="1" rowsetRow="6"
ancestorRowsetId="0"
            ancestorRowsetRow="2" cellCoordinate="5">
          <column name="Quarter_memberCaption" value="2005 Q 2"
state="OK"
              type="string"/>
          <column name="Quarter" value="2005 Q 2" state="OK"
              type="string"/>
        </row>
        <row detailRow="7" rowsetId="1" rowsetRow="7"
ancestorRowsetId="0"
            ancestorRowsetRow="2" cellCoordinate="6">
          <column name="Quarter_memberCaption" value="2005 Q 3"
state="OK"
              type="string"/>
          <column name="Quarter" value="2005 Q 3" state="OK"
              type="string"/>
        </row>
        <row detailRow="8" rowsetId="1" rowsetRow="8"
ancestorRowsetId="0"
            ancestorRowsetRow="2" cellCoordinate="7">
          <column name="Quarter_memberCaption" value="2005 Q 4"
state="OK"
              type="string"/>
          <column name="Quarter" value="2005 Q 4" state="OK"
              type="string"/>
        </row>
        <row detailRow="0" rowsetId="0" rowsetRow="3"
ancestorRowsetId="-1"
            ancestorRowsetRow="-1" cellCoordinate="-1">
          <column name="Year_memberCaption" value="2006"
              state="OK"
              type="string"/>
          <column name="Year" value="2006" state="OK"
type="string"/>
        </row>
        <row detailRow="9" rowsetId="1" rowsetRow="9"
ancestorRowsetId="0"
            ancestorRowsetRow="3" cellCoordinate="8">
          <column name="Quarter_memberCaption" value="2006 Q 1"
state="OK"
              type="string"/>
          <column name="Quarter" value="2006 Q 1" state="OK"
              type="string"/>
        </row>
        <row detailRow="10" rowsetId="1" rowsetRow="10"
            ancestorRowsetId="0" ancestorRowsetRow="3"
cellCoordinate="9">
          <column name="Quarter_memberCaption" value="2006 Q 2"
state="OK"
              type="string"/>
          <column name="Quarter" value="2006 Q 2" state="OK"
              type="string"/>
        </row>
        <row detailRow="11" rowsetId="1" rowsetRow="11"
            ancestorRowsetId="0" ancestorRowsetRow="3"
            cellCoordinate="10">
          <column name="Quarter_memberCaption" value="2006 Q 3"
state="OK"
              type="string"/>
          <column name="Quarter" value="2006 Q 3" state="OK"
              type="string"/>
        </row>
        <row detailRow="12" rowsetId="1" rowsetRow="12"
            ancestorRowsetId="0" ancestorRowsetRow="3"
            cellCoordinate="11">
          <column name="Quarter_memberCaption" value="2006 Q 4"
state="OK"
              type="string"/>
          <column name="Quarter" value="2006 Q 4" state="OK"
              type="string"/>
        </row>
      </edge>
      <edge ordinal="2">
        <row detailRow="1" rowsetId="0" rowsetRow="1"
ancestorRowsetId="-1"
            ancestorRowsetRow="-1" cellCoordinate="0">
          <column name="Revenue_memberCaption" value="Revenue"
state="OK"
              type="string"/>
          <column name="Revenue" value="Revenue" state="OK"
              type="string"/>
        </row>
      </edge>
      <cells>
        <cell coordinates="0,0,0">
```

```xml
            <column name="value" value="3984224.5" state="OK" type="double"
                    currency="USD"/>
        </cell>
        <cell coordinates="0,0,1">
            <column name="value" value="975181" state="OK" type="double"
                    currency="USD"/>
        </cell>
        <cell coordinates="0,0,2">
            <column name="value" value="0" state="OK" type="integer"
                    currency="USD"/>
        </cell>
        <cell coordinates="0,0,3">
            <column name="value" value="321983.9" state="OK" type="double"
                    currency="USD"/>
        </cell>
        <cell coordinates="0,0,4">
            <column name="value" value="1314078.74" state="OK" type="double"
                    currency="USD"/>
        </cell>
        <cell coordinates="0,1,0">
            <column name="value" value="5075177.96" state="OK" type="double"
                    currency="USD"/>
        </cell>
        <cell coordinates="0,1,1">
            <column name="value" value="1871413.2" state="OK" type="double"
                    currency="USD"/>
        </cell>
        <cell coordinates="0,1,2">
            <column name="value" value="0" state="OK" type="integer"
                    currency="USD"/>
        </cell>
        <cell coordinates="0,1,3">
            <column name="value" value="611615.92" state="OK" type="double"
                    currency="USD"/>
        </cell>
        <cell coordinates="0,1,4">
            <column name="value" value="1678313.76" state="OK" type="double"
                    currency="USD"/>
        </cell>
        <cell coordinates="0,2,0">
            <column name="value" value="4645255.82" state="OK" type="double"
                    currency="USD"/>
        </cell>
        <cell coordinates="0,2,1">
            <column name="value" value="1169527.46" state="OK" type="double"
                    currency="USD"/>
        </cell>
        <cell coordinates="0,2,2">
            <column name="value" value="0" state="OK" type="integer"
                    currency="USD"/>
        </cell>
        <cell coordinates="0,2,3">
            <column name="value" value="477277.94" state="OK" type="double"
                    currency="USD"/>
        </cell>
        <cell coordinates="0,2,4">
            <column name="value" value="1704449.46" state="OK" type="double"
                    currency="USD"/>
        </cell>
        <cell coordinates="0,3,0">
            <column name="value" value="6766670.6" state="OK" type="double"
                    currency="USD"/>
        </cell>
        <cell coordinates="0,3,1">
            <column name="value" value="1581859.2" state="OK" type="double"
                    currency="USD"/>
        </cell>
        <cell coordinates="0,3,2">
            <column name="value" value="0" state="OK" type="integer"
                    currency="USD"/>
        </cell>
        <cell coordinates="0,3,3">
            <column name="value" value="125578.48" state="OK" type="double"
                    currency="USD"/>
        </cell>
        <cell coordinates="0,3,4">
            <column name="value" value="2447955.56" state="OK" type="double"
                    currency="USD"/>
        </cell>
        <cell coordinates="0,4,0">
            <column name="value" value="5638050.96" state="OK" type="double"
                    currency="USD"/>
        </cell>
        <cell coordinates="0,4,1">
            <column name="value" value="1553249.68" state="OK" type="double"
                    currency="USD"/>
        </cell>
        <cell coordinates="0,4,2">
            <column name="value" value="1469736.86" state="OK" type="double"
                    currency="USD"/>
        </cell>
        <cell coordinates="0,4,3">
            <column name="value" value="212782.46" state="OK" type="double"
                    currency="USD"/>
        </cell>
        <cell coordinates="0,4,4">
            <column name="value" value="1731011.08" state="OK" type="double"
                    currency="USD"/>
        </cell>
        <cell coordinates="0,5,0">
            <column name="value" value="8479008.16" state="OK" type="double"
                    currency="USD"/>
        </cell>
        <cell coordinates="0,5,1">
            <column name="value" value="3763377.96" state="OK" type="double"
                    currency="USD"/>
        </cell>
        <cell coordinates="0,5,2">
            <column name="value" value="3149221.48" state="OK" type="double"
                    currency="USD"/>
        </cell>
        <cell coordinates="0,5,3">
            <column name="value" value="343938.86" state="OK" type="double"
                    currency="USD"/>
        </cell>
        <cell coordinates="0,5,4">
            <column name="value" value="2976215.82" state="OK" type="double"
                    currency="USD"/>
        </cell>
        <cell coordinates="0,6,0">
            <column name="value" value="7760772.76" state="OK" type="double"
                    currency="USD"/>
        </cell>
        <cell coordinates="0,6,1">
            <column name="value" value="1485202.42" state="OK" type="double"
                    currency="USD"/>
        </cell>
        <cell coordinates="0,6,2">
            <column name="value" value="2181671.86" state="OK" type="double"
                    currency="USD"/>
        </cell>
```

```
<cell coordinates="0,6,3">
    <column name="value" value="316900.86" state="OK"
type="double"
        currency="USD"/>
</cell>
<cell coordinates="0,6,4">
    <column name="value" value="2750767.14" state="OK"
type="double"
        currency="USD"/>
</cell>
<cell coordinates="0,7,0">
    <column name="value" value="9495774.58" state="OK"
type="double"
        currency="USD"/>
</cell>
<cell coordinates="0,7,1">
    <column name="value" value="2796438.82" state="OK"
type="double"
        currency="USD"/>
</cell>
<cell coordinates="0,7,2">
    <column name="value" value="2842044.34" state="OK"
type="double"
        currency="USD"/>
</cell>
<cell coordinates="0,7,3">
    <column name="value" value="114608.46" state="OK"
type="double"
        currency="USD"/>
</cell>
<cell coordinates="0,7,4">
    <column name="value" value="3497714" state="OK"
type="double"
        currency="USD"/>
</cell>
<cell coordinates="0,8,0">
    <column name="value" value="8162650.72" state="OK"
type="double"
        currency="USD"/>
</cell>
<cell coordinates="0,8,1">
    <column name="value" value="1796219.58" state="OK"
type="double"
        currency="USD"/>
</cell>
<cell coordinates="0,8,2">
    <column name="value" value="1848903.76" state="OK"
type="double"
        currency="USD"/>
</cell>
<cell coordinates="0,8,3">
    <column name="value" value="12193.09" state="OK"
type="double"
        currency="USD"/>
</cell>
<cell coordinates="0,8,4">
    <column name="value" value="2278711.36" state="OK"
type="double"
        currency="USD"/>
</cell>
<cell coordinates="0,9,0">
    <column name="value" value="9449464.76" state="OK"
type="double"
        currency="USD"/>
</cell>
<cell coordinates="0,9,1">
    <column name="value" value="3559611.16" state="OK"
type="double"
        currency="USD"/>
</cell>
<cell coordinates="0,9,2">
    <column name="value" value="3438010.72" state="OK"
type="double"
        currency="USD"/>
</cell>
<cell coordinates="0,9,3">
    <column name="value" value="232016.54" state="OK"
type="double"
        currency="USD"/>
</cell>
<cell coordinates="0,9,4">
    <column name="value" value="3612369.56" state="OK"
type="double"
        currency="USD"/>
</cell>
<cell coordinates="0,10,0">
    <column name="value" value="7370377.14" state="OK"
type="double"
        currency="USD"/>
</cell>
<cell coordinates="0,10,1">
    <column name="value" value="2152470.24" state="OK"
type="double"
        currency="USD"/>
</cell>
<cell coordinates="0,10,2">
    <column name="value" value="2392993.94" state="OK"
type="double"
        currency="USD"/>
</cell>
<cell coordinates="0,10,3">
    <column name="value" value="192489.8" state="OK"
type="double"
        currency="USD"/>
</cell
<cell coordinates="0,10,4">
    <column name="value" value="3073856.14" state="OK"
type="double"
        currency="USD"/>
</cell>
<cell coordinates="0,11,0">
    <column name="value" value="12886562.96" state="OK"
            type="double" currency="USD"/>
</cell>
<cell coordinates="0,11,1">
    <column name="value" value="3200914.86" state="OK"
type="double"
        currency="USD"/>
</cell>
<cell coordinates="0,11,2">
    <column name="value" value="3568767.64" state="OK"
type="double"
        currency="USD"/>
</cell>
<cell coordinates="0,11,3">
    <column name="value" value="99990.8" state="OK"
type="double"
        currency="USD"/>
</cell>
<cell coordinates="0,11,4">
    <column name="value" value="4829023.24" state="OK"
type="double"
        currency="USA"/>
</cell>
</cells>
</partialDataset>
```

Equivalence of Layout, Informational, and Data Objects

The following table attempts to provide a mapping between elements/objects in an original report layout specification, the RSAPI informational objects, an the RSAPI data retrieval objects.

| Original report layout specification | Corresponding RSAPI Informational Object | RSAPI Data Retrieval Object |
|---|---|---|
| Data item reference. | IRSColumnInfo | IRSColumnValue |
| Dimensional property reference. | IRSColumnInfo | IRSColumnValue |
| Value set. | IRSRowsetInfo | IRSEdgeIterator |
| Header/footer. | IRSRowsetInfo, IRSRowsetLayout | IRSEdgeIterator |

-continued

| Original report layout specification | Corresponding RSAPI Informational Object | RSAPI Data Retrieval Object |
|---|---|---|
| Group. | IRSRowsetLayout, IRSLevelInfo | IRSEdgeIterator::GetAncestor |
| Edge. | IRSEdgeInfo | IRSEdgeIterator |
| Layout specification. | IRSDatasetInfo | IRSPartialDataset |

The systems and methods according to the present invention may be implemented by any hardware, software or a combination of hardware and software having the functions described above. The software code, either in its entirety or apart thereof, may be stored in a computer readable memory. Further, a computer data signal representing the software code that maybe embedded in a carrier wave may be transmitted via a communication network. Such a computer readable memory and a computer data signal are also within the scope of the present invention, as well as the hardware, software and the combination thereof While particular embodiments of the present invention have been shown and described, changes and modifications may be made to such embodiments without departing from the true scope of the invention.

What is claimed is:

1. A method comprising:
receiving a query that is based on a predefined format of an arbitrary query language;
performing, with a data analyzing component, the query to obtain a query result;
providing the query result and a report layout specification from the data analyzing component to a data processing component, the data processing component being on a computer;
associating, with the data processing component, the query result with at least one element of the report layout specification to generate an association;
providing the query result from the data processing component through an interface based on the report layout specification without reliance on the type of the arbitrary query language to a rendering component; and
providing the report layout specification from the data analyzing component to the rendering component to render the query result in a report according to the association without reliance on the type of the arbitrary query language,
wherein a report specified in the report layout specification is one of a chart, a detailed list report type that is tabular with each row including a detailed fact value that corresponds to a combination of non-fact columns in each row, a grouped summary report type that is tabular with at least one grouping column and at least one fact column, a grouped detail list report type that includes detail and summary fact values, a cross tab report that includes a set of members along a row and column axis, and a master detail report that associates rows within a report with other reports including parallel detail information.

2. The method of claim 1, further comprising providing a master data set with respect to each report specified in the report layout specification, the master dataset providing access to a dataset informational object and a partial dataset data retrieval object.

3. The method of claim 1, wherein a cell of a cross tab in the cross tab report includes a data value corresponding to an intersection of members from the set of members.

4. A computer readable memory having computer executable instructions stored therein, wherein the computer executable instructions when executed on a computer cause the computer to:
receive a query that is based on a predefined format of an arbitrary query language;
perform, with a data analyzing component, the query to obtain a query result;
provide the query result and a report layout specification from the data analyzing component to a data processing component, the data processing component being on the computer;
associate, with the data processing component, the query result with at least one element of the report layout specification to generate an association;
provide the query result from the data processing component through an interface based on the report layout specification without reliance on the type of the arbitrary query language to a rendering component; and
provide the report layout specification from the data analyzing component to the rendering component to render the query result in a report according to the association without reliance on the type of the arbitrary query language,
wherein a report specified in the report layout specification is one of a chart, a detailed list report type that is tabular with each row including a detailed fact value that corresponds to a combination of non-fact columns in each row, a grouped summary report type that is tabular with at least one grouping column and at least one fact column, a grouped detail list report type that includes detail and summary fact values, a cross tab report that includes a set of members along a row and column axis, and a master detail report that associates rows within a report with other reports including parallel detail information.

5. The computer readable memory of claim 4, wherein the computer is further caused to provide a master data set with respect to each report specified in the report layout specification, the master dataset providing access to a dataset informational object and a partial dataset data retrieval object.

6. The computer readable memory of claim 4, wherein a cell of a cross tab in the cross tab report includes a data value corresponding to an intersection of members from the set of members.

7. A method comprising:
receiving a query that is based on a predefined format of an arbitrary query language;
performing the query to obtain a query result;
providing the query result and a report layout specification to a computer;
associating, with the computer, the query result with at least one element of the report layout specification to generate an association;
providing the query result through an interface based on the report layout specification without reliance on the type of the arbitrary query language; and
rendering the query result in a report according to the association without reliance on the type of the arbitrary query language,
wherein a report specified in the report layout specification is one of a chart, a detailed list report type that is tabular with each row including a detailed fact value that corresponds to a combination of non-fact columns in each row, a grouped summary report type that is tabular with at least one grouping column and at least one fact column, a grouped detail list report type that includes detail and summary fact values, a cross tab report that includes a set of members along a row and column axis, and a master detail report that associates rows within a report with other reports including parallel detail information.

8. The method of claim 7, further comprising providing a master data set with respect to each report specified in the report layout specification, the master dataset providing access to a dataset informational object and a partial dataset data retrieval object.

* * * * *